(12) United States Patent
Lu

(10) Patent No.: US 11,218,246 B2
(45) Date of Patent: Jan. 4, 2022

(54) ERROR CORRECTION METHOD AND ERROR CORRECTION APPARATUS

(71) Applicant: HUAWEI TECHNOLOGIES CO., LTD., Shenzhen (CN)

(72) Inventor: Yuchun Lu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 13 days.

(21) Appl. No.: 16/889,231

(22) Filed: Jun. 1, 2020

(65) Prior Publication Data

US 2020/0295871 A1 Sep. 17, 2020

Related U.S. Application Data

(63) Continuation of application No. PCT/CN2018/115991, filed on Nov. 16, 2018.

(30) Foreign Application Priority Data

Dec. 1, 2017 (CN) .......................... 201711248568.5

(51) Int. Cl.
*H04L 1/00* (2006.01)
*H04L 25/03* (2006.01)

(52) U.S. Cl.
CPC ...... *H04L 1/0045* (2013.01); *H04L 25/03057* (2013.01)

(58) Field of Classification Search
CPC ............. H04L 1/0045; H04L 25/03057; H04L 1/0047; H04L 1/0061; H04L 25/03203; H04L 25/03324; H04L 25/03146
(Continued)

(56) References Cited

U.S. PATENT DOCUMENTS 7,873,128 B2    1/2011   Yamanaka et al.
8,644,372 B1    2/2014   Riani et al.
(Continued)

FOREIGN PATENT DOCUMENTS

CN    1242121 A    1/2000
CN    1684452 A    10/2005
(Continued)

OTHER PUBLICATIONS

Bhoja, "PAM4 Signaling for intra-data center and Data center to data center connectivity (DCI)," XP033101487, 2017 Optical Fiber Communications Conference and Exhibition (OFC), OSA, total 54 pages (Feb. 20, 2017).

*Primary Examiner* — Fitwi Y Hailegiorgis
(74) *Attorney, Agent, or Firm* — Leydig, Voit & Mayer, Ltd.

(57) ABSTRACT

This application provides an error correction method and apparatus, relates to the field of communications technologies, so as to reduce a bit error rate of a decision feedback equalizer (DFE) and improve equalization performance. The method includes: obtaining a decision signal of a DFE; obtaining at least one of an input signal, an equalized output signal, and a difference of the DFE, where the difference is a difference between a level value of the decision signal and a level value of the equalized output signal; determining a symbol location of an end of burst error of the decision signal based on detection of at least one of the decision signal, the equalized output signal, and the difference; and when the symbol location is detected, performing error correction on the decision signal based on the at least one of the input signal, the equalized output signal, and the difference.

20 Claims, 12 Drawing Sheets

(58) Field of Classification Search
USPC .......................................................... 375/233
See application file for complete search history.

(56) References Cited

U.S. PATENT DOCUMENTS

| | | | | |
|---|---|---|---|---|
| 2001/0009565 | A1* | 7/2001 | Singvall | ............ H04L 25/03057 |
| | | | | 375/233 |
| 2002/0176524 | A1* | 11/2002 | Popper | ................... H04B 1/123 |
| | | | | 375/346 |
| 2006/0227858 | A1 | 10/2006 | Wu et al. | |

FOREIGN PATENT DOCUMENTS

| | | |
|---|---|---|
| CN | 101174914 A | 5/2008 |
| CN | 101257583 A | 9/2008 |
| CN | 102362493 A | 2/2012 |
| CN | 102404260 A | 4/2012 |
| CN | 105791188 A | 7/2016 |
| EP | 0294897 A1 | 12/1988 |
| GB | 2291316 A | 1/1996 |

\* cited by examiner

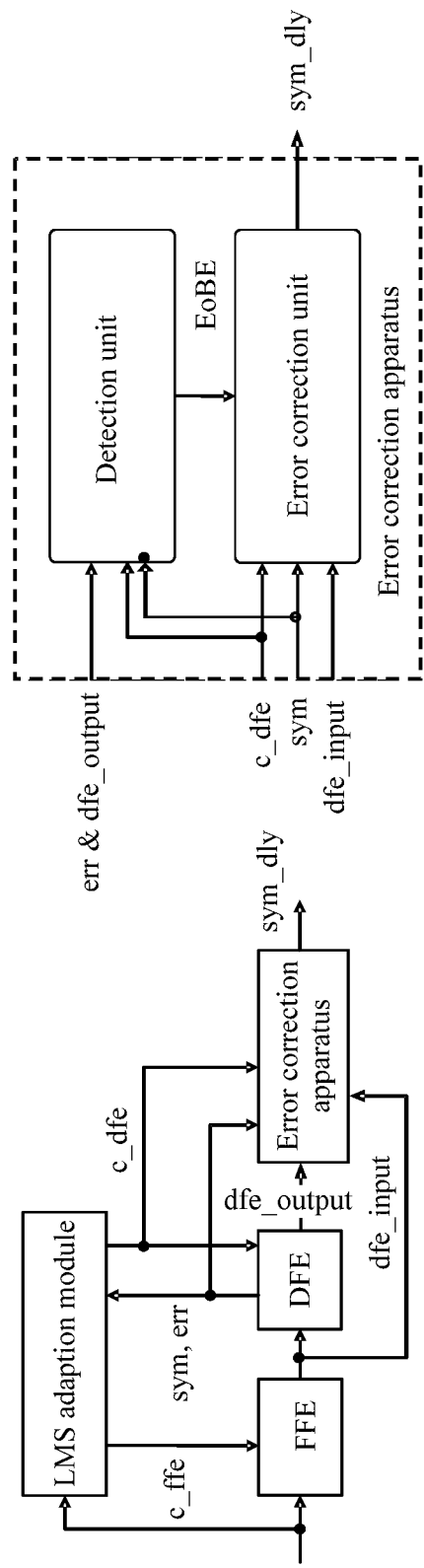

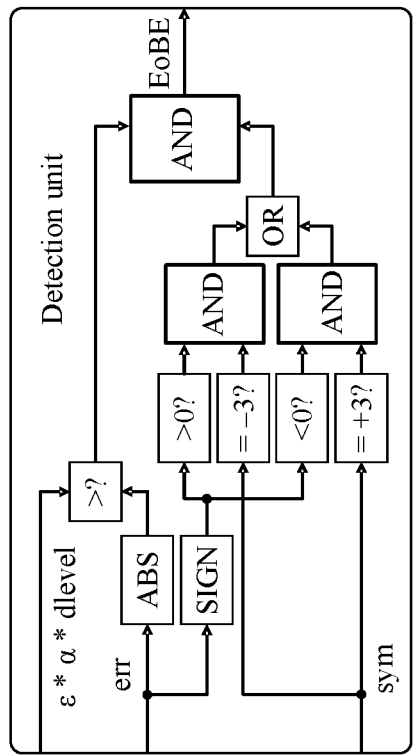
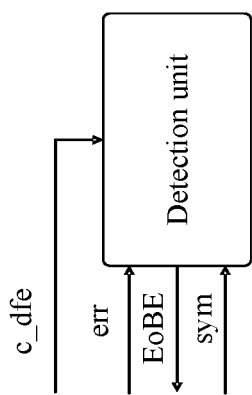
FIG. 7(a)
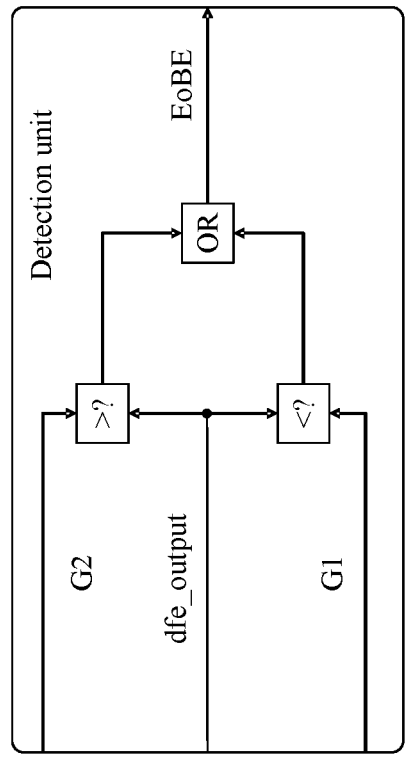
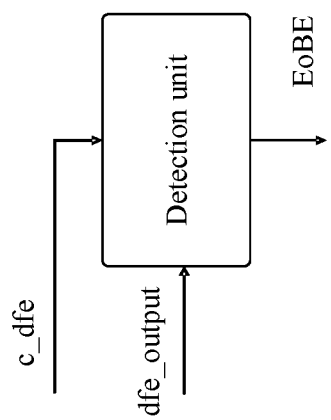
FIG. 7(b)

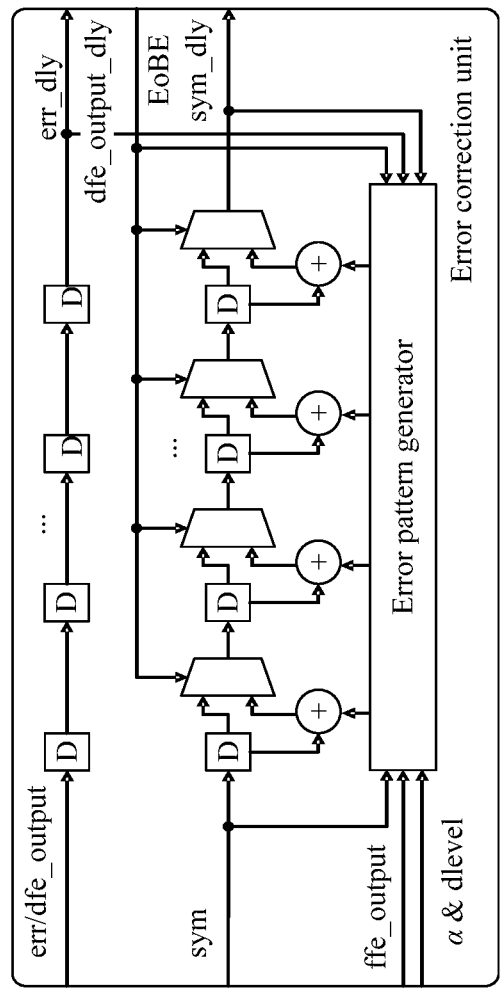
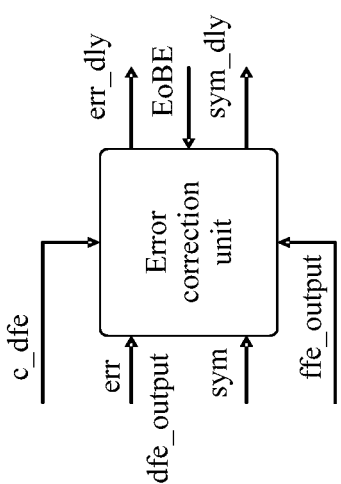
FIG. 11(c)

ERROR CORRECTION METHOD AND ERROR CORRECTION APPARATUS

CROSS-REFERENCE TO RELATED APPLICATIONS

This application is a continuation of International Application No. PCT/CN2018/115991, filed on Nov. 16, 2018, which claims priority to Chinese Patent Application No. 201711248568.5, filed on Dec. 1, 2017. The disclosures of the aforementioned applications are hereby incorporated by reference in their entireties.

TECHNICAL FIELD

Embodiments of this application relate to the field of communications technologies, and in particular, to an error correction method and an error correction apparatus.

BACKGROUND

A high-speed link technology is a basic technology for chips and interfaces, including an electrical link and an optical link. In a high-speed electrical link, an insertion loss generated during insertion of a cable or an optical fiber into a transceiver leads to inter-symbol interference (ISI). In a high-speed optical link, dispersion of the optical fiber and bandwidth limitations of optical-to-electrical conversion components in the transceiver, such as a driver, a modulator), an optoelectronic detector (PIN/APD), and a transimpedance amplifier (TIA), also lead to ISI. Therefore, an equalizer needs to be disposed in the transceiver to compensate for the ISI caused by the insertion loss or the bandwidth limitations of the components.

Currently, a decision feedback equalizer (DFE) is a frequently used equalizer. As shown in FIG. 1, a structure of the DFE includes an adder (+), a subtractor (−), a register (D), a multiplier (×), and a decision maker (indicated by a broken line in FIG. 1). The DFE is a nonlinear feedback equalizer. After receiving an input signal, the DFE equalizes the input signal by using a decision signal of a previous signal, to obtain an equalized output signal. Then, the equalized output signal is decided by the decision maker to obtain a decision signal of the equalized output signal. In a case of no bit error, the DFE can accurately remove the ISI through equalization, without amplifying noise.

However, because the DFE is a feedback equalizer, a bit error caused by an erroneous decision made on a signal affects a decision of a next signal, causing bit error transfer and increasing a bit error rate of the DFE.

SUMMARY

This application provides an error correction method and an error correction apparatus, so as to reduce a bit error rate of a DFE and improve equalization performance.

According to a first aspect, this application provides an error correction method, including: obtaining a decision signal of a decision feedback equalizer DFE;

obtaining at least one of an input signal, an equalized output signal, and a difference of the DFE, where the difference is a difference between a level value of the decision signal and a level value of the equalized output signal; determining a symbol location of an end of burst error of the decision signal based on detection of at least one of the decision signal, the equalized output signal, and the difference; and when the symbol location is detected, performing error correction on the decision signal based on the at least one of the input signal, the equalized output signal, and the difference.

By using the error correction method provided in this application, the input signal, the equalized output signal, the difference, and a decision of the DFE can be used to detect the symbol location of the end of burst error caused by the DFE, and perform error correction on an erroneous decision signal, so as to reduce a bit error rate of the DFE and improve equalization performance.

Optionally, the determining a symbol location of an end of burst error of the decision signal based on detection of at least one of the decision signal, the equalized output signal, and the difference is performed in the following manner: when both the difference and the decision signal within a symbol period meet a condition A and a condition B, or meet a condition A and a condition C, determining that the symbol period is the symbol location of the end of burst error of the decision signal, where the condition A is that an absolute value of the difference within the symbol period is greater than a preset decision threshold; the condition B is that the difference within the symbol period is greater than 0, and the level value of the decision signal within the symbol period is equal to a preset minimum level value; and the condition C is that the difference within the symbol period is less than 0, and the level value of the decision signal within the symbol period is equal to a preset maximum level value.

Optionally, the determining a symbol location of an end of burst error of the decision signal based on detection of at least one of the decision signal, the equalized output signal, and the difference is performed in the following manner: when the equalized output signal within a symbol period meets a condition E or meets a condition F, determining that the symbol period is the symbol location of the end of burst error of the decision signal, where the condition E is that the level value of the equalized output signal within the symbol period is less than a difference between a preset minimum level value and a preset decision threshold; and the condition F is that the level value of the equalized output signal within the symbol period is greater than a sum of a preset maximum level value and the decision threshold.

In the two optional manners, the symbol location of the end of burst error of the decision signal of the DFE is detected based on a bit error transfer feature of the DFE.

Optionally, the performing error correction on the decision signal based on the at least one of the input signal, the equalized output signal, and the difference includes: performing, based on the at least one of the input signal, the equalized output signal, and the difference, backtracking error correction on J decision signals that are located before the symbol location, to obtain a correct decision signal sequence.

Optionally, the performing, based on the at least one of the input signal, the equalized output signal, and the difference, backtracking error correction on J decision signals that are located before the symbol location, to obtain a correct decision signal sequence includes: performing the backtracking error correction on the J decision signals based on the input signal and the output signal by using a maximum likelihood sequence estimation algorithm, to obtain the correct decision signal sequence.

Optionally, the performing, based on the at least one of the input signal, the equalized output signal, and the difference, backtracking error correction on J decision signals that are located before the symbol location, to obtain a correct decision signal sequence includes: performing the backtracking error correction on the J decision signals by using error control coding ECC of the input signal, to obtain the correct decision signal sequence.

Optionally, the performing, based on the at least one of the input signal, the equalized output signal, and the difference, backtracking error correction on J decision signals that are located before the symbol location, to obtain a correct decision signal sequence includes: performing the backtracking error correction on the J decision signals based on the input signal and the difference in a direct detection manner, to obtain the correct decision signal sequence.

In the foregoing four optional manners, equalization performance of the DFE can be close to a performance curve of an MLSE. Compared with an existing DFE equalization manner, the equalization performance of the DFE is improved. Optionally, before the determining a symbol location of an end of burst error of the decision signal based on detection of at least one of the decision signal, the equalized output signal, and the difference, the method further includes: performing (1+D) decoding on the obtained decision signal, to obtain a decoded decision signal; and the performing error correction on the decision signal based on the at least one of the input signal, the equalized output signal, and the difference includes: performing error correction on the decoded decision signal at the symbol location.

In this optional manner, the equalization performance of the DFE can be close to equalization performance of an AWGN channel under a (1+D) channel condition. Compared with the existing DFE equalization manner, the equalization performance of the DFE is improved.

Optionally, the input signal is a pulse amplitude modulation PAM signal, a quadrature phase shift keying QPSK signal, or a quadrature amplitude modulation QAM signal.

According to a second aspect, this application provides an error correction apparatus, including: an obtaining unit, configured to obtain a decision signal of a decision feedback equalizer DFE, and further configured to obtain at least one of an input signal, an equalized output signal, and a difference of the DFE, where the difference is a difference between a level value of the decision signal and a level value of the equalized output signal; a detection unit, configured to determine a symbol location of an end of burst error of the decision signal based on detection of at least one of the decision signal, the equalized output signal, and the difference; and an error correction unit, configured to: when the detection unit detects the symbol location, perform error correction on the decision signal based on the at least one of the input signal, the equalized output signal, and the difference.

Optionally, the detection unit determines the symbol location of the end of burst error of the decision signal based on the detection of the at least one of the decision signal, the equalized output signal, and the difference in the following manner: when both the difference and the decision signal within a symbol period meet a condition A and a condition B, or meet a condition A and a condition C, determining that the symbol period is the symbol location of the end of burst error of the decision signal, where the condition A is that an absolute value of the difference within the symbol period is greater than a preset decision threshold; the condition B is that the difference within the symbol period is greater than 0, and the level value of the decision signal within the symbol period is equal to a preset minimum level value; and the condition C is that the difference within the symbol period is less than 0, and the level value of the decision signal within the symbol period is equal to a preset maximum level value.

Optionally, the detection unit determines the symbol location of the end of burst error of the decision signal based on the detection of the at least one of the decision signal, the equalized output signal, and the difference in the following manner: when the equalized output signal within a symbol period meets a condition E or meets a condition F, determining that the symbol period is the symbol location of the end of burst error of the decision signal, where the condition E is that the level value of the equalized output signal within the symbol period is less than a difference between a preset minimum level value and a preset decision threshold; and the condition F is that the level value of the equalized output signal within the symbol period is greater than a sum of a preset maximum level value and the decision threshold.

Optionally, that the error correction unit performs the error correction on the decision signal based on the at least one of the input signal, the equalized output signal, and the difference specifically includes: performing, based on the at least one of the input signal, the equalized output signal, and the difference, backtracking error correction on J decision signals that are located before the symbol location, to obtain a correct decision signal sequence.

Optionally, that the error correction unit performs, based on the at least one of the input signal, the equalized output signal, and the difference, the backtracking error correction on the J decision signals that are located before the symbol location, to obtain the correct decision signal sequence specifically includes: performing the backtracking error correction on the J decision signals based on the input signal and the output signal by using a maximum likelihood sequence estimation algorithm, to obtain the correct decision signal sequence.

Optionally, that the error correction unit performs, based on the at least one of the input signal, the equalized output signal, and the difference, the backtracking error correction on the J decision signals that are located before the symbol location, to obtain the correct decision signal sequence specifically includes: performing the backtracking error correction on the J decision signals by using error control coding ECC of the input signal, to obtain the correct decision signal sequence.

Optionally, that the error correction unit performs, based on the at least one of the input signal, the equalized output signal, and the difference, the backtracking error correction on the J decision signals that are located before the symbol location, to obtain the correct decision signal sequence specifically includes: performing the backtracking error correction on the J decision signals based on the input signal and the difference in a direct detection manner, to obtain the correct decision signal sequence.

Optionally, the error correction apparatus further includes a decoding unit; the decoding unit is configured to: before the detection unit determines the symbol location of the end of burst error of the decision signal based on the detection of the at least one of the decision signal, the equalized output signal, and the difference, perform (1+D) decoding on the obtained decision signal, to obtain a decoded decision signal; and that the error correction unit performs the error correction on the decision signal based on the at least one of the input signal, the equalized output signal, and the difference specifically includes: performing error correction on the decoded decision signal at the symbol location.

Optionally, the input signal is a pulse amplitude modulation PAM signal, a quadrature phase shift keying QPSK signal, or a quadrature amplitude modulation QAM signal.

For technical effects of the error correction apparatus provided in this application, refer to technical effects of the first aspect or the implementations of the first aspect. Details are not described herein again.

According to a third aspect, this application further provides an error correction apparatus, including a processor, a memory, a bus, and a communications interface. The memory is configured to store a computer executable instruction. The processor is connected to the memory and the communications interface by using the bus. When the error correction apparatus runs, the processor executes the computer executable instruction stored in the memory, to implement the error correction method in the first aspect and the implementations of the first aspect.

For technical effects of the error correction apparatus provided in this application, refer to technical effects of the first aspect or the implementations of the first aspect. Details are not described herein again.

According to a fourth aspect, this application further provides a computer storage medium, and the computer storage medium stores an instruction. When run on a computer, the instruction enables the computer to perform the method in the first aspect.

According to a fifth aspect, this application further provides a computer program product that includes an instruction. When run on a computer, the computer program product enables the computer to perform the method in the first aspect.

BRIEF DESCRIPTION OF DRAWINGS

FIG. 4(a) and FIG. 4(b) are a schematic structural diagram 1 of an error correction apparatus according to this application;

FIG. 7(a) and FIG. 7(b) are schematic diagrams of a detection principle according to this application;

FIG. 11(a) to FIG. 11(c) are schematic diagrams of an error correction principle according to this application;

DESCRIPTION OF EMBODIMENTS

Figure 1:
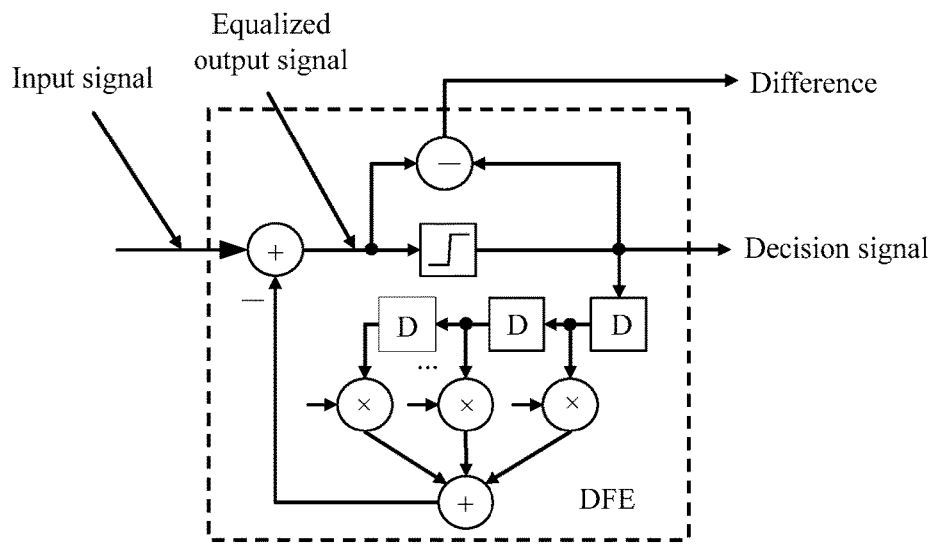
FIG. 1 is a schematic structural diagram of a DFE.
Figure 2A:
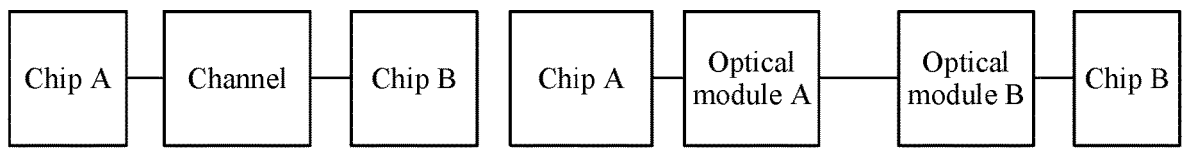
FIG. 2(a) to FIG. 2(d) are schematic diagrams of an interconnection link according to this application.
Figure 2B:
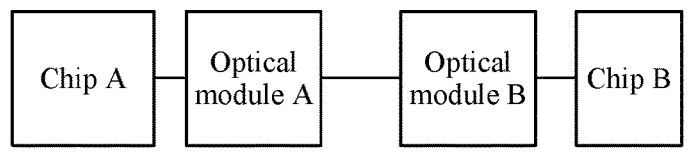
Figure 2C:
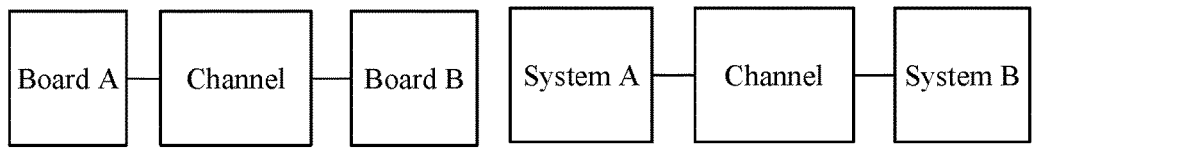
Figure 2D:
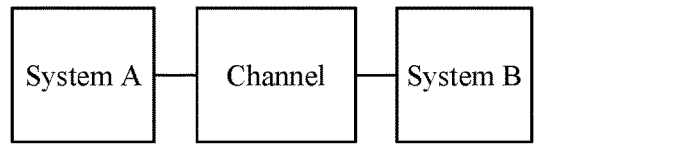

This application provides an error correction method and an error correction apparatus, which may be applied to a scenario that requires a high-speed interconnection. For example, FIG. 2(a) to FIG. 2(d) are schematic diagrams of an interconnection link according to this application. FIG. 2(a) is an interconnection link of an interconnection between chips by using a channel; FIG. 2(b) is an interconnection link of an interconnection between a chip and an optical module, and an interconnection between optical modules; FIG. 2(c) is an interconnection link of an interconnection between boards by using a channel; and FIG. 2(d) is an interconnection link of an interconnection between systems by using a channel. The interconnection link may be an electrical link, such as a printed circuit board (PCB) or a coaxial cable; or the interconnection link may be an optical link or a wireless link. The system mentioned in FIG. 2(d) may be a terminal device such as a general-purpose computer, a router, a switch, or even a mobile phone.

Figure 3A:
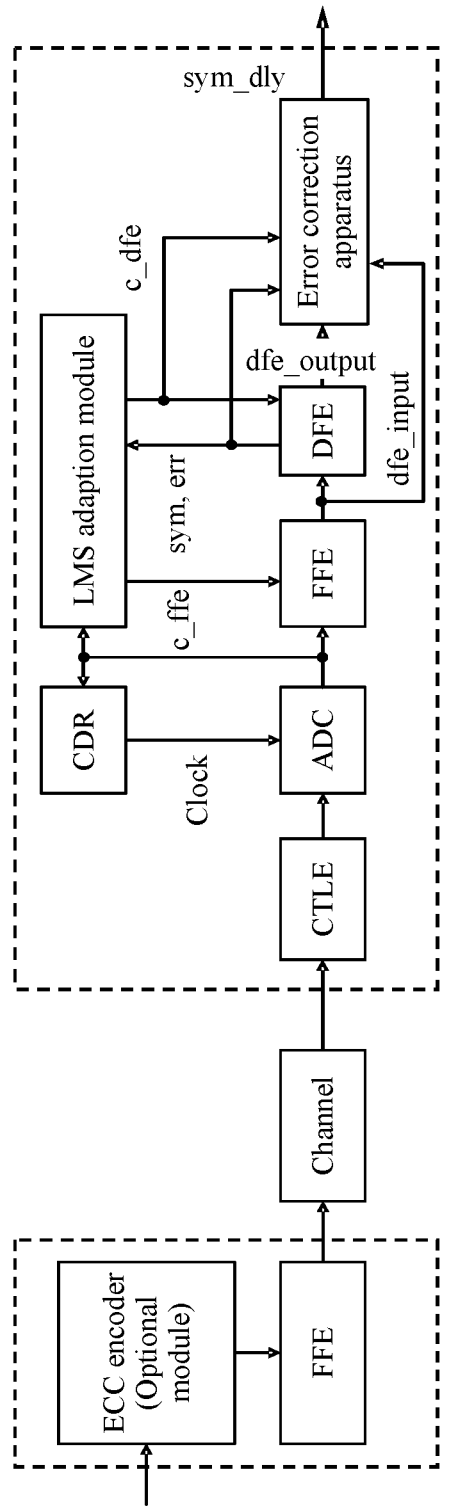
FIG. 3(a) and FIG. 3(b) are schematic diagrams of a transceiver architecture according to this application.
Figure 3B:
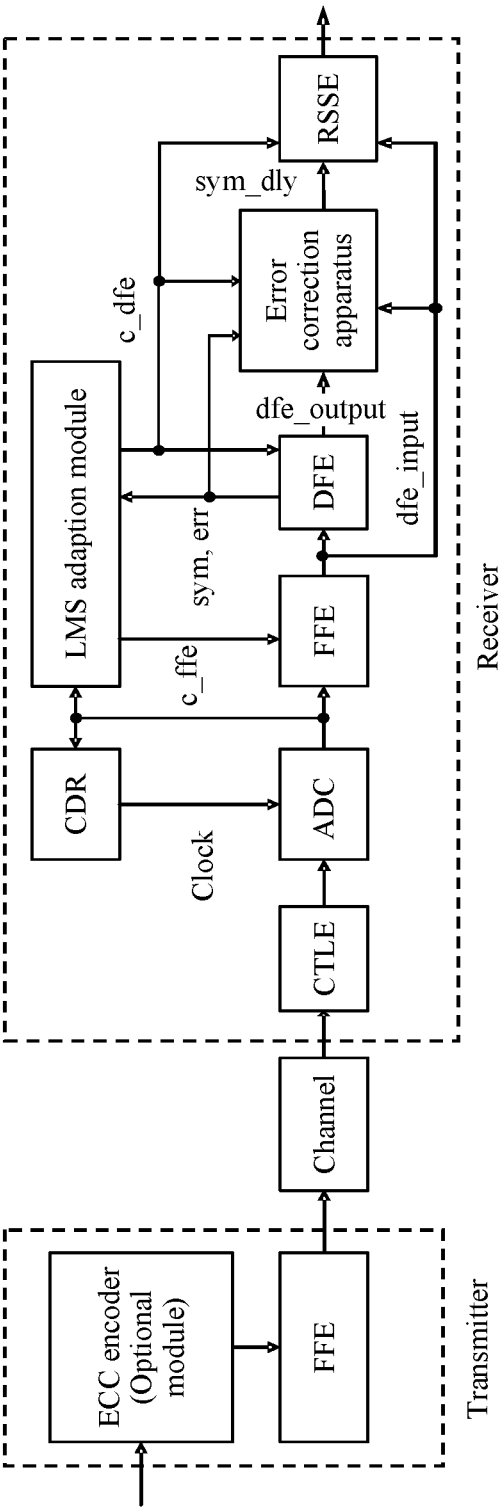

The error correction apparatus provided in this application may be specifically a module with a nonlinear error correction (NEC) function, and may be disposed in a receiver with a DFE in the chip, the optical module, the board, and the system, to detect and correct a decision signal erroneously decided by the DFE, so as to reduce a bit error rate of the DFE and improve an equalization capability. For example, FIG. 3(a) and FIG. 3(b) are schematic diagrams of a transceiver architecture according to this application. FIG. 3(a) is a schematic diagram of a transceiver architecture including a continuous time linear equalizer (CTLE), a feed forward equalizer (FFE), a DFE, and an error correction apparatus. In the transceiver architecture, a transmitter includes an FFE or includes an error control coding (ECC) encoder. After the FFE of the transmitter outputs a signal, the signal is transmitted to a receiver by using a channel. The receiver adds the error correction apparatus provided in this application in a conventional CTLE, FFE, and DFE combination mode. The receiver includes a clock and data recovery (CDR) module, a least mean square (LMS) adaption module, a CTLE, an analog to digital converter (ADC), an FFE, a DFE, and the error correction apparatus. An arrow shown in FIG. 3(a) indicates a direction of a signal flow between modules. The LMS adaption module sends a coefficient (c_dfe) of the DFE to the DFE, the FFE, and the error correction apparatus, and the coefficient includes a tap coefficient α of the DFE and an interval dlevel between two adjacent levels in a PAM signal. A signal output by the FFE is an input signal (dfe_input) of the DFE, and the input signal is input to the DFE and the error correction apparatus. The DFE outputs, to the error correction apparatus, an equalized output signal (dfe_output) obtained by equalizing the input signal, and outputs, to the LMS adaption module and the error correction apparatus, a decision signal (sym) obtained by deciding the equalized output signal, and a difference (err) between the decision signal and the equalized output signal. The error correction apparatus performs error correction on the decision signal based on the received signal, and then outputs a corrected decision signal (sym_dly).

FIG. 3(b) is a schematic diagram of a transceiver architecture including the CTLE, the FFE, the DFE, a reduced-state sequence estimation (RSSE), and the error correction apparatus. Compared with the transceiver architecture including the CTLE, the FFE, the DFE, and the error correction apparatus shown in FIG. 3(a), the RSSE is added at a receive end. The input signal of the DFE and the coefficient of the DFE output by the LMS adaption module are also input to the RSSE. The corrected decision signal output by the error correction apparatus is also input to the RSSE, and is output as an equalization result of the entire receiver after the RSSE decides the corrected decision signal.

FIG. 4(a) and FIG. 4(b) are a schematic structural diagram of an error correction apparatus according to this application. FIG. 4(a) shows an external connection structure of the error correction apparatus. An input signal (dfe_input) of a DFE is separately input to the error correction apparatus and the DFE, and an equalized output signal (dfe_output), a difference (err), and a decision signal (sym) output by the DFE are input to the error correction apparatus. Optionally, the error correction apparatus may also receive a coefficient (c_dfe) of the DFE output by an LMS adaption module. FIG. 4(b) is a schematic diagram of an internal structure of the error correction apparatus, mainly including a detection unit and an error correction unit. The detection unit is configured to detect, based on at least one of the received equalized output signal, difference, and decision signal, a symbol location of an end of burst error (EoBE) of the decision signal output by the DFE (in this application, the symbol location of the end of burst error of the decision signal is indicated by the EoBE). After detecting the EoBE, the detection unit sends the EoBE to the error correction unit. The error correction unit performs error correction on an erroneous decision based on at least one of the input signal, the equalized output signal, and the difference, and the EoBE detected by the detection unit, to obtain a correct decision signal (sym_dly), and outputs the correct decision signal.

In this application, the error correction apparatus may detect the EoBE and perform the error correction on the erroneous decision signal based on a bit error transfer feature of the DFE. Therefore, to help a reader to understand the error correction method provided in this application, before the error correction method is described, the bit error transfer feature of the DFE is first briefly described.

First, the first bit error transfer feature of the DFE is that bit error transfer of the DFE ends at a symbol location at which a level value of the equalized output signal is less than "a lowest symbol level—a positive feedback error", and at a symbol location at which the level value of the equalized output signal is greater than "a highest symbol level—a negative feedback error". That is, the EoBE is the symbol location at which the level value of the equalized output signal is less than "the lowest symbol level—the positive feedback error", or the symbol location at which the level value of the equalized output signal is greater than "the highest symbol level—the negative feedback error".

Figure 5:
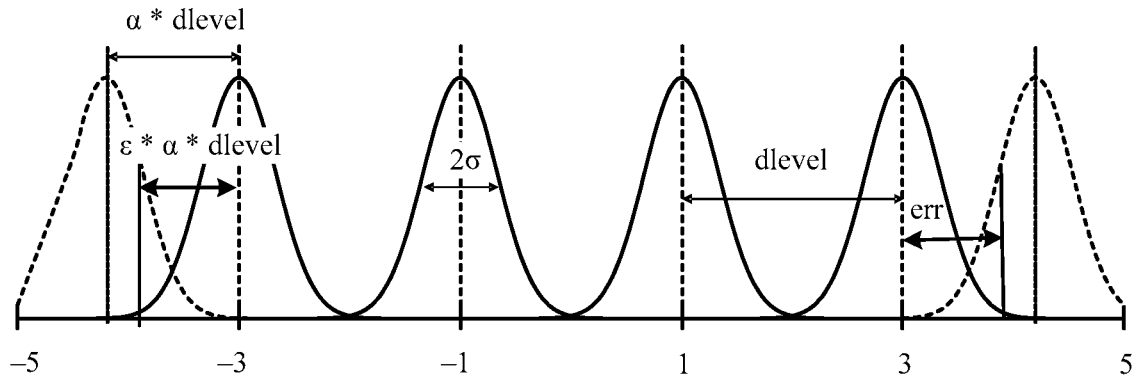
FIG. 5 is a schematic diagram of bit error transfer of a DFE according to this application.

For example, a (1+αD) channel under PAM-4 modulation is used as an example, and a bit error transfer principle of the DFE may be shown in FIG. 5. When no bit error transfer occurs, level distribution of an equalized output signal output by a DFE is probability distribution of random noise superimposed on the basis of four symbol levels (−3, −1, 1, and 3) of a PAM-4 signal. If the random noise is white Gaussian noise, the level distribution of the equalized output signal is shown by a "solid curve" in FIG. 5. When bit error transfer occurs, it is assumed that the DFE can cause an error of "ε*α*dlevel" between adjacent signal levels, where c indicates a coefficient value used to adjust an "error anomaly" decided by the DFE, and the parameter is configurable. The DFE decides all equalized output signals as one of −3, −1, 1, and 3 closest to all the equalized output signals. Therefore, if a level value of an equalized output signal with a burst error is located between "3+ε*α*dlevel" and "−3−ε*α*dlevel", the DFE still erroneously decides the equalized output signal, to obtain an erroneous decision signal. However, when the level value of the equalized output signal is greater than "3+ε*α*dlevel" or less than "(−3)−ε*α*dlevel", the DFE decides all equalized output signals as 3 or −3, to obtain a correct decision signal, and the bit error transfer ends. For example, as shown by a "dashed curve" in FIG. 5, when the equalized output signal is close to 5 due to the bit error transfer, the DFE still decides the equalized output signal as 3. When the equalized output signal is close to −5 due to the bit error transfer, the DFE still decides the equalized output signal as −3. Therefore, the first bit error transfer feature of the DFE is that the bit error transfer of the DFE ends at the symbol location at which the level value of the equalized output signal is less than "the lowest symbol level—the positive feedback error", and at the symbol location at which the level value of the equalized output signal is greater than "the highest symbol level—the negative feedback error".

Then, the second bit error transfer feature is that the bit error transfer of the DFE has a regular error pattern.

For example, the (1+αD) channel under the PAM-4 modulation is used as an example, and burst error pattern distribution may be shown in Table 1 and Table 2. A to-be-transmitted signal is first input to a 1/(1+D) encoder of a transmitter, sent to a [1, Pos1] channel (α=Pos1) after 1/(1+D) encoding, and transmitted to a receiver by using the [1, Pos1] channel, so that the DFE in the receiver performs equalization, a decision, and (1+D) decoding.

It may be understood that the signal input to the 1/(1+D) encoder is a signal that should be obtained after a (1+D) decoder decodes a decision signal. The decision signal obtained after the DFE decides an equalized output signal should be the same as a signal output by the 1/(1+D) encoder. In Table 1 and Table 2, levels −3, −1, 1, and 3 are indicated by using 0, 1, 2, and 3.

Table 1 is an error pattern in which a burst error ends at the symbol location at which the level value of the equalized output signal is less than "the lowest symbol level—the positive feedback error". The burst error of the decision signal starts from the 3rd symbol period and ends at the $17^{th}$ symbol period. If the decision signal is shifted downward by one level relative to the signal output by the 1/(1+D) encoder, the error pattern of the decision signal is −1. If the decision signal is shifted upward by one level relative to the signal output by the 1/(1+D) encoder, the error pattern of the decision signal is 1.

TABLE 1

| Pos1/Main | 1 | | | | | | | | | | | | | | | | | | |
|---|---|---|---|---|---|---|---|---|---|---|---|---|---|---|---|---|---|---|---|
| 1/(1 + D) encoder input | 1 | 0 | 1 | 3 | 3 | 0 | 3 | 2 | 0 | 1 | 3 | 3 | 0 | 0 | 0 | 0 | 2 | 3 | 0 | 3 |
| 1/(1 + D) encoder output | 1 | 3 | 2 | 1 | 2 | 2 | 1 | 1 | 3 | 2 | 1 | 2 | 2 | 2 | 2 | 2 | 0 | 3 | 1 | 2 |
| After passing a [1, Pos1] channel | 1 | 4 | 5 | 3 | 3 | 4 | 3 | 2 | 4 | 5 | 3 | 3 | 4 | 4 | 4 | 4 | 2 | 3 | 4 | 3 |

TABLE 1-continued

| Pos1/Main | 1 | | | | | | | | | | | | | | | | | | | |
|---|---|---|---|---|---|---|---|---|---|---|---|---|---|---|---|---|---|---|---|---|
| Equalized output signal | 1 | 3 | 2 | 2 | 1 | 3 | 0 | 2 | 2 | 3 | 0 | 3 | 1 | 3 | 1 | 3 | 1 | 3 | 1 | 2 |
| Decision signal | 1 | 3 | 1 | 2 | 1 | 3 | 0 | 2 | 2 | 3 | 0 | 3 | 1 | 3 | 1 | 3 | 0 | 3 | 1 | 2 |
| DFE error pattern | 0 | 0 | -1 | 1 | -1 | 1 | -1 | 1 | -1 | 1 | -1 | 1 | -1 | 1 | -1 | 1 | 0 | 0 | 0 | 0 |
| (1 + D) decoding output | 1 | 0 | 0 | 3 | 3 | 0 | 3 | 2 | 0 | 1 | 3 | 3 | 0 | 0 | 0 | 0 | 3 | 3 | 0 | 3 |
| Error pattern of each codeword | 0 | 0 | -1 | 0 | 0 | 0 | 0 | 0 | 0 | 0 | 0 | 0 | 0 | 0 | 0 | 0 | 1 | 0 | 0 | 0 |
| Symbol ID | 1 | 2 | 3 | 4 | 5 | 6 | 7 | 8 | 9 | 10 | 11 | 12 | 13 | 14 | 15 | 16 | 17 | 18 | 19 | 20 |

Table 2 is an error pattern in which a burst error ends at the symbol location at which the level value of the equalized output signal is greater than "the highest symbol level—the negative feedback error". The burst error of the decision signal starts from the $3^{rd}$ symbol period and ends at the $18^{th}$ symbol period.

TABLE 2

| Pos1/Main | 1 | | | | | | | | | | | | | | | | | | | |
|---|---|---|---|---|---|---|---|---|---|---|---|---|---|---|---|---|---|---|---|---|
| 1/(1 + D) encoder input | 1 | 0 | 1 | 3 | 3 | 0 | 3 | 2 | 0 | 1 | 3 | 3 | 0 | 2 | 1 | 3 | 0 | 1 | 0 | 3 |
| 1/(1 + D) encoder output | 1 | 3 | 2 | 1 | 2 | 2 | 1 | 1 | 3 | 2 | 1 | 2 | 2 | 0 | 1 | 2 | 2 | 3 | 1 | 2 |
| After passing a [1, Pos1] channel | 1 | 4 | 5 | 3 | 3 | 4 | 3 | 2 | 4 | 5 | 3 | 3 | 4 | 2 | 1 | 3 | 4 | 5 | 4 | 6 |
| Equalized output signal | 1 | 3 | 2 | 2 | 1 | 3 | 0 | 2 | 2 | 3 | 0 | 3 | 1 | 1 | 0 | 3 | 1 | 4 | 1 | 2 |
| Decision signal | 1 | 3 | 1 | 2 | 1 | 3 | 0 | 2 | 2 | 3 | 0 | 3 | 1 | 1 | 0 | 3 | 1 | 3 | 1 | 2 |
| DFE error pattern | 0 | 0 | -1 | 1 | -1 | 1 | -1 | 1 | -1 | 1 | -1 | 1 | -1 | 1 | -1 | 1 | -1 | 0 | 0 | 0 |
| (1 + D) decoding output | 1 | 0 | 0 | 3 | 3 | 0 | 3 | 2 | 0 | 1 | 3 | 3 | 0 | 2 | 1 | 3 | 0 | 0 | 0 | 3 |
| Error pattern of each codeword | 0 | 0 | -1 | 0 | 0 | 0 | 0 | 0 | 0 | 0 | 0 | 0 | 0 | 0 | 0 | 0 | 0 | -1 | 0 | 0 |
| Symbol ID | 1 | 2 | 3 | 4 | 5 | 6 | 7 | 8 | 9 | 10 | 11 | 12 | 13 | 14 | 15 | 16 | 17 | 18 | 19 | 20 |

It can be learned from data recorded in Table 1 and Table 2 that "1" and "-1" are alternately distributed in the error pattern of the decision signal.

However, the decision signal decoded by the (1+D) decoder is compared with the signal input to the 1/(1+D) encoder, and a location of the burst error of the decoded decision signal is located at a symbol location of a start of burst error of the decision signal before decoding, and a symbol location of an end of burst error.

It should be noted that, in the second bit error transfer feature of the DFE, the error pattern distribution of the decision signal may further have other regular distribution manners in addition to the above-enumerated alternate distribution of "1" and "-1". For example, alternate distribution is performed according to "-2, -1, 0, 1, and 2". All the distribution manners are used for the error correction method provided in this application.

According to the error correction method provided in this application, based on the two bit error transfer features of the DFE, the symbol location of the end of burst error of the decision signal is detected, and the error correction is performed when the symbol location is detected, so as to reduce a bit error rate of the DFE and improve equalization performance of the DFE.

The error correction method provided in this application is described below in combination with a specific embodiment.

Figure 6:
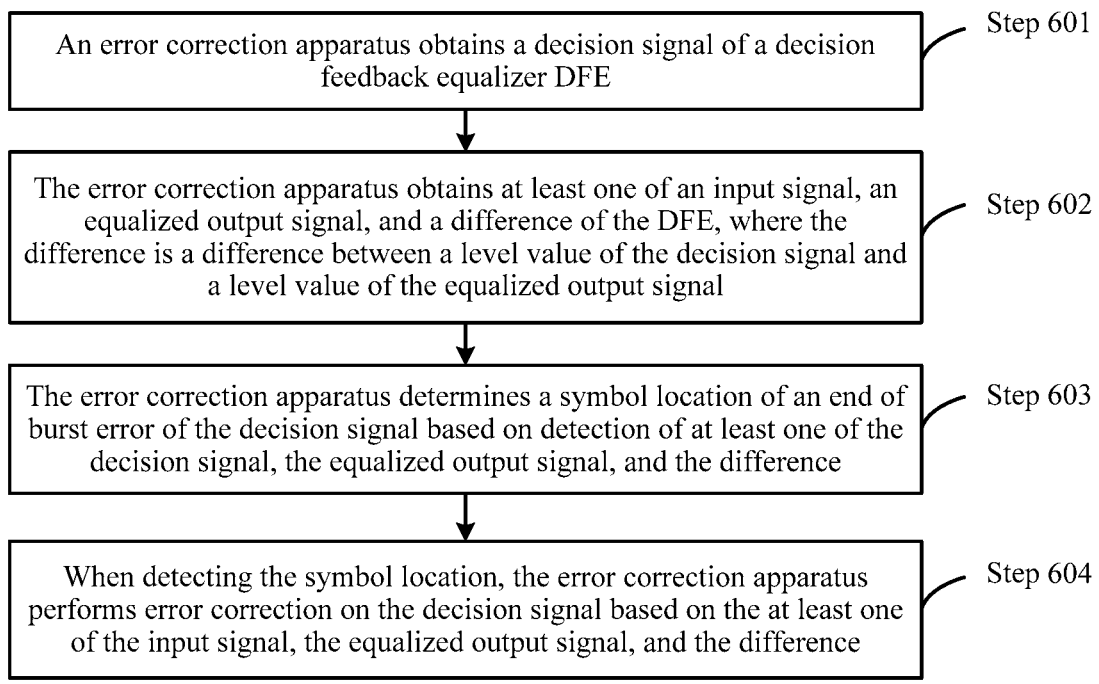
FIG. 6 is a flowchart 1 of an embodiment of an error correction method according to this application.

FIG. 6 is a flowchart of an embodiment of an error correction method according to this application. The method includes the following steps.

Step 601: An error correction apparatus obtains a decision signal of a decision feedback equalizer DFE.

Step 602: The error correction apparatus obtains at least one of an input signal, an equalized output signal, and a difference of the DFE, where the difference is a difference between a level value of the decision signal and a level value of the equalized output signal.

In this application, which signals of the input signal, the equalized output signal, and the difference need to be obtained may be specifically determined by determining a symbol location of an end of burst error of the decision signal and a manner used for error correction.

The input signal is a pulse amplitude modulation (PAM) signal, a quadrature phase shift keying (QPSK) signal, or a quadrature amplitude modulation (QAM) signal. In this application, an example of the difference=the level value of the decision signal−the level value of the equalized output signal is used for description.

Step 603: The error correction apparatus determines a symbol location of an end of burst error of the decision signal based on detection of at least one of the decision signal, the equalized output signal, and the difference.

For example, this application provides two possible detection manners based on the foregoing first bit error transfer feature.

Manner 1: When both the difference and the decision signal within a symbol period meet a condition A and a condition B, or meet a condition A and a condition C, it is determined that the symbol period is the symbol location of the end of burst error of the decision signal.

The condition A is that an absolute value of the difference within the symbol period is greater than a preset decision threshold.

The condition B is that the difference within the symbol period is greater than 0, and the level value of the decision signal within the symbol period is equal to a preset minimum level value.

The condition C is that the difference within the symbol period is less than 0, and the level value of the decision signal within the symbol period is equal to a preset maximum level value.

Optionally, the preset decision threshold may be "ε*α*dlevel", where indicates a preset coefficient of an error anomaly of the DFE. When obtaining the decision signal, the error correction apparatus may simultaneously obtain α*dlevel, for example, receive c_dfe sent by an LAS adaption module in FIG. 3(a) and FIG. 3(b). Alternatively, ε*α*dlevel may be a fixed value preset in the error correction apparatus. This is not limited in this application.

The minimum level value and the maximum level value may be determined based on level distribution of a channel in an applied scenario. For example, under PAM-4 modulation, the minimum level value may be −3, and the maximum level value may be 3.

Therefore, based on a case in which the decision threshold is "ε*α*dlevel", the minimum level value is −3, and the maximum level value is 3, a detection condition of Manner 1 may be indicated as A & (B|C), and the conditions A, B, and C are defined as:

$A=|err|>\varepsilon*\alpha*dlevel$ $B=(err>0)$ & $(sym=-3)$ $C=(err<0)$ & $(sym=+3)$ For example, a schematic diagram of the detection condition may be shown in FIG. 7(a). A comparator, a SIGN function module, an ABS function module, an AND operation module (AND), and an OR operation module (OR) are connected to each other according to a signal flow direction (a direction indicated by an arrow) shown in FIG. 7(a), to implement the detection condition A & (B|C). The comparator includes a comparator configured to compare sizes of two input signals at an input end, and includes a comparator configured to compare with a size of a preset value in the comparator. The ABS function module is configured to take an absolute value of a received value. The SIGN function module is configured to take a sign of a difference err.

Manner 2: When the equalized output signal within a symbol period meets a condition E or meets a condition F, it is determined that the symbol period is the symbol location of the end of burst error of the decision signal.

The condition E is that the level value of the equalized output signal within the symbol period is less than a difference between a preset minimum level value and a preset decision threshold.

The condition F is that the level value of the equalized output signal within the symbol period is greater than a sum of a preset maximum level value and the decision threshold.

A detection condition of Manner 2 may be indicated as F|E. Assuming that the difference between the minimum level value and the preset decision threshold is G1, and the sum of the maximum level value and the decision threshold is G2, a schematic diagram of F|E may be shown in FIG. 7(b), and two comparators and an OR operation module (OR) are connected according to a signal flow direction shown in FIG. 7(b), to implement the detection condition F|E.

Step 604: When detecting the symbol location, the error correction apparatus performs error correction on the decision signal based on the at least one of the input signal, the equalized output signal, and the difference.

For example, after obtaining each input signal, equalized output signal, difference, and decision signal, the error correction apparatus may cache these signals and output these signals after delaying these signals for J+1 symbol periods. To be specific, the error correction apparatus caches an input signal sequence, an equalized output signal sequence, a difference sequence, and a decision signal sequence, and each sequence includes J+1 signals.

When the error correction apparatus determines that the cached $(J+1)^{th}$ symbol period is the symbol location of the end of burst error of the decision signal, the error correction apparatus may perform, based on the at least one of the input signal, the equalized output signal, and the difference, backtracking error correction on J decision signals that are located before the symbol location, to obtain a correct decision signal sequence, and then output the correct decision signal sequence.

It should be noted that there are a plurality of manners to implement the backtracking error correction. This application enumerates the following three manners of the backtracking error correction, to describe an example of a specific process of the backtracking error correction.

(1) The backtracking error correction is performed on the J decision signals based on the input signal and the output signal by using a maximum likelihood sequence estimation algorithm, to obtain the correct decision signal sequence.

(2) The backtracking error correction is performed on the J decision signals by using ECC of the input signal, to obtain the correct decision signal sequence.

(3) The backtracking error correction is performed on the J decision signals based on the input signal and the difference in a direct detection manner, to obtain the correct decision signal sequence.

For ease of description, the input signal cached in the error correction apparatus is indicated as x[k], the equalized output signal may be indicated as y[k], the decision signal may be indicated as s[k], and the difference may be indicated as e[k], where k=EoBE, EoBE−1, . . . , and EoBE−J. The EoBE indicates the symbol location of the end of burst error of the decision symbol.

For the foregoing manner (1), the error correction apparatus may detect a correction value sequence by using the maximum likelihood sequence estimation algorithm, and a specific process is as follows:

(1) A correction value of a decision signal s[EoBE−1] located in the (k=EoBE−1)$^{th}$ symbol period is determined based on a feature of a difference e[EoBE] or a decision signal s[EoBE] at the EoBE.

For example, if the feature of the decision signal is used as a determining criterion, when s[EoBE]=the maximum level value, it indicates that s[EoBE−1] is not in error, or is "erroneously decided downward by one level", that is, an error pattern of the detected s[EoBE−1] may be indicated as {−1, 0}. Therefore, when s[EoBE]=the maximum level value, s[EoBE−1] may need to "be corrected upward by one level" or "not be corrected", that is, a correction value set of s[EoBE−1] is {0, 1}.

When s[EoBE]=the minimum level value, it indicates that s[EoBE−1] is not in error, or is "erroneously decided upward by one level", that is, an error pattern of the detected s[EoBE−1] may be indicated as {0, 1}. Therefore, when s[EoBE]=the maximum level value, s[EoBE−0] may "not be corrected" or "be corrected downward by one level", that is, a correction value set of s[EoBE−1] may be indicated as {−1, 0}.

Because s[EoBE] is correct, an initial correction value of s[EoBE] is {0}.

Optionally, the feature of the difference e[EoBE] has an equivalent determining effect as the feature of the decision signal s[EoBE]. If the feature of the difference is used as a determining criterion, when e[EoBE]<0, s[EoBE−1] may need to "be corrected upward by one level" or "not be corrected". Therefore, when e[EoBE]<0, a correction value set of s[EoBE−1] is {0, 1}.

When e[EoBE]>0, s[EoBE−1] may need to "be corrected downward by one level" or "not be corrected". That is, when e[EoBE]>0, a correction value set of s[EoBE−1] is {−1, 0}.

(2) A metric value of a correction path used to track from the EoBE back to the (EoBE−1)$^{th}$ symbol period is calculated based on an input signal x(EoBE) and the decision signal s[EoBE] at the EoBE, an input signal x(EoBE−1) and the decision signal s[EoBE−1] located in the (EoBE−1)$^{th}$ symbol period, and a corresponding correction value set by using Formula 1.

$$(\Sigma t=0^{L-1} s'[k-t] \cdot h[t] - x[k])^2 \quad \text{(Formula 1)}$$

where L indicates a channel response length, s'[k] indicates a corrected decision symbol, and h[t] indicates a channel response.

(3) Based on the second bit error transfer feature of the DFE, when the correction value set of s[EoBE−1] is {0, 1}, a correction value set of s[EoBE−2] is {−1, 0}. When the correction value set of s[EoBE−1] is {−1, 0}, a correction value set of s[EoBE−2] is {0, 1}. Therefore, after the correction value set of s[EoBE−2] is determined based on the correction value set of s[EoBE−1] determined in S1, a metric value of a correction path used to track from the EoBE back to the (EoBE−2)$^{th}$ symbol period may be calculated.

By analogy, for backtracking from the EoBE to a decision signal s[EoBE−J] located in the (k=EoBE−J)$^{th}$ symbol period, a metric value of at least one correction path used to track from the EoBE back to the (k=EoBE−J)$^{th}$ symbol period is calculated based on a determined correction value set of each decision signal s[k].

(4) A correction path with a minimum metric value is selected, and a correction value sequence is determined based on the correction path.

(5) Error correction is performed on a cached decision signal sequence based on the obtained correction value sequence, to obtain a correct decision signal sequence.

A (1+αD) channel under PAM-4 modulation is used as an example below to describe an example of (1) to (5).

It is assumed that α=1, the channel response length L=2, the channel response is {h[0], h[1]}={1, α}={1, 1}, J=8, and ε*α*dlevel=1.3. The error correction apparatus sequentially receives the input signal x[k], the output equalization signal y[k], the decision signal s[k], and the difference e[k] located in the 0$^{th}$ to 8$^{th}$ symbol periods, and performs caching in a sequence of receiving, where k=0, 1, 2, . . . , and 8. Values of x[k], y[k], s[k], and e[k] cached in the 0$^{th}$ to 8$^{th}$ symbol periods are shown in Table 3:

TABLE 3

| k | Input signal (x) | Equalized output signal (y) | Decision signal (s) | Original signal | Difference (e) |
|---|---|---|---|---|---|
| 0 | −0.1970 | 2.8030 | 3 | 3 | 0.1970 |
| 1 | 5.9664 | 2.9664 | 3 | 3 | 0.0336 |
| 2 | 1.0411 | −1.9589 | −1 | −3 | 0.9589 |
| 3 | −4.2390 | −3.2390 | −3 | −1 | 0.2390 |
| 4 | −4.5096 | −1.5096 | −1 | −3 | 0.5096 |
| 5 | −2.0712 | −1.0712 | −1 | 1 | 0.0712 |
| 6 | −0.0770 | 0.9230 | 1 | −1 | 0.0770 |
| 7 | 1.3850 | 0.3850 | 1 | 3 | 0.6150 |
| 8 | 6.5013 | 5.5013 | 3 | 3 | −2.5013 |

The original signal in Table 3 is a signal that a transmitter needs to send to a receiver, that is, a decision signal that should be obtained after the DFE decides the equalized output signal. It can be learned from Table 3 that decision signals located in the 2$^{nd}$ to 7$^{th}$ symbol periods have burst errors, and are different from original signals.

After obtaining each x[k], y[k], s[k], and e[k] in Table 3, the error correction apparatus detects, by using the detection condition in Manner 1 or Manner 2, whether a current symbol period is the symbol location of the end of burst error.

Assuming that Manner 1 is used as an example, the error correction apparatus detects that a difference e[8] and a decision signal s[8] in the 8$^{th}$ symbol period meet the detection condition in Manner 1. That is, |−2.5013|>1.3, and s[8]=3. Therefore, the error correction apparatus determines EoBE=8, in other words, the 8$^{th}$ symbol period is the symbol location of the end of burst error, so that the error correction apparatus may start detecting the correction value sequence by using the maximum likelihood sequence estimation algorithm, to complete backtracking error correction on eight decision signals before the 8$^{th}$ symbol period, that is, track from s[8] back to s[7], s[6], . . . , and s[0] for error correction.

S10. Because s[8]=3, that is, s[EoBE]=a maximum level value, a correction value set of s[7] is {0, 1}.

S11. Calculate, according to Formula 1, a metric value of a correction path used to track from the (k=8)$^{th}$ symbol period back to the (k=EoBE−1=7)$^{th}$ symbol period. For example, a value keeps four decimal places. A specific calculation process is as follows:

It may be determined based on a correction value set {0} of s[8] and the correction value set {0, 1} of s[7] that there are two correction paths between the 8$^{th}$ symbol period and the 7$^{th}$ symbol period: a correction path 0 to 0 and a correction path 0 to 1 respectively. The correction path 0 to 0 indicates that correction values of s[8] and s[7] are 0, in other words, on the correction path 0 to 0, the correction value sequence is "0, 0". The correction path 0 to 1 indicates that a correction value of s[8] is 0, and a correction value of s[7] is 1, in other words, on the correction path 0 to 1, the correction value sequence is "0, 1".

For the correction value path 0 to 0, a corrected decision signal s'[8]=3, and s'[7]=1. s'[8]=3, s'[7]=1, x[8]=6.5013, L=2, and {h[0], h[1]}={1, 1} are substituted into Formula 1, and an obtained metric value of the correction value path 0 to 0 is:

$$(s'[8]\cdot h[0]+s'[7]\cdot h[1]-x[8])^2=(3\cdot 1+1-6.5013)^2=6.2566$$

For the correction value path 0 to 1, a corrected decision signal s'[8]=3, and s'[7]=3. s'[8]=3, s'[7]=3, x[8]=6.5013, L=2, and {h[0], h[1]}={1, 1} are substituted into Formula 1, and an obtained metric value of the correction value path 0 to 1 is:

$$(s'[8]\cdot h[0]+s'[7]\cdot h[1]-x[8])^2=(3\cdot 1+3\cdot 1-6.5013)^2=0.2513.$$

S12. Because an error pattern alternates in {−1, 0, 1} based on the foregoing second bit error transfer feature, it may be determined based on the correction value set {0, 1} of s[7] that a correction value set of s[6] is {−1, 0}. It may be determined based on the correction value set {0, 1} of s[7] and the correction value set {−1, 0} of s[6] that there are four branch paths between the 7$^{th}$ symbol period and the 6$^{th}$ symbol period: a branch path 0 to −1, a branch path 0 to 0, a branch path 1 to −1, and a branch path 1 to 0 respectively.

Metric values of the four branch paths between the 7$^{th}$ symbol period and the 6$^{th}$ symbol period are calculated by using the same method as that in S11. A specific process is as follows:

A metric value of the branch path 0 to −1 is:

$$(s'[7]\cdot h[0]+s'[6]\cdot h[1]-x[7])^2=(1\cdot 1+(-1)\cdot 1-1.3850)^2=1.9182$$

A metric value of the branch path 0 to 0 is:

$$(s'[7]\cdot h[0]+s'[6]\cdot h[1]-x[7])^2=(1\cdot 1+1\cdot 1-1.3850)^2=0.3782.$$

A metric value of the branch path 1 to −1 is:

$$(s'[7]\cdot h[0]+s'[6]\cdot h[1]-x[7])^2=(3\cdot 1+(-1)\cdot 1-1.3850)^2=0.3782.$$

A metric value of the branch path 1 to 0 is:

$$(s'[7]\cdot h[0]+s'[6]\cdot h[1]-x[7])^2=(3\cdot 1+(-1)\cdot 1-1.3850)^2=6.8382.$$

Metric values of branch paths 0 to −1 and 0 to 0 between the 7$^{th}$ symbol period and the 6$^{th}$ symbol period are calculated based on the correction value 0 of s[7], and metric values of branch paths 1 to −1 and 1 to 0 between the 7$^{th}$ symbol period and the 6$^{th}$ symbol period are calculated based on the correction value 1 of s[7]. Therefore, a metric value of each branch path may be superimposed on metric values of the two correction paths used to track back to s[7], to obtain a metric value of each correction path used to track back to s[6]. A specific process is as follows:

The metric value 1.9182 of the branch path 0 to −1 is superimposed on the metric value 6.2566 of the correction path on which the correction value 0 of s[7] is located, to obtain a metric value 8.1748 of a first correction path used to track back to the correction value −1 of s[6]. A correction value sequence corresponding to the correction path is "0, 0, 1".

The metric value 0.3782 of the branch path 1 to −1 is superimposed on the metric value 0.2513 of the correction path on which the correction value 1 of s[7] is located, to obtain a metric value 0.6295 of a second correction path used to track back to the correction value −1 of s[6]. A correction value sequence corresponding to the correction path is "0, 1, −1".

The metric value 0.6295 of the second correction path is less than the metric value 8.1748 of the first correction path. Therefore, the second correction path is determined as the correction path used to track back to the correction value −1 of s[6], and the metric value 0.6295 of the correction path is recorded.

The metric value 0.3782 of the branch path 0 to 0 is superimposed on the metric value 6.2566 of the correction path on which the correction value 0 of s[7] is located, to obtain a metric value 6.6348 of a first correction path used to track back to the correction value 0 of s[6]. A correction value sequence corresponding to the correction path is "0, 0, 0".

The metric value 6.8382 of the branch path 1 to 0 is superimposed on the metric value 0.2513 of the correction path on which the correction value 1 of s[7] is located, to obtain a metric value 7.0895 of a second correction path used to track back to the correction value 0 of s[6]. A correction value sequence corresponding to the correction path is "0, 1, 0".

The metric value 6.6348 of the first correction path is less than the metric value 7.0895 of the second correction path. Therefore, the first correction path is determined as the correction path used to track back to the correction value 0 of s[6], and the metric value 6.6348 of the correction path is recorded.

Figure 8:
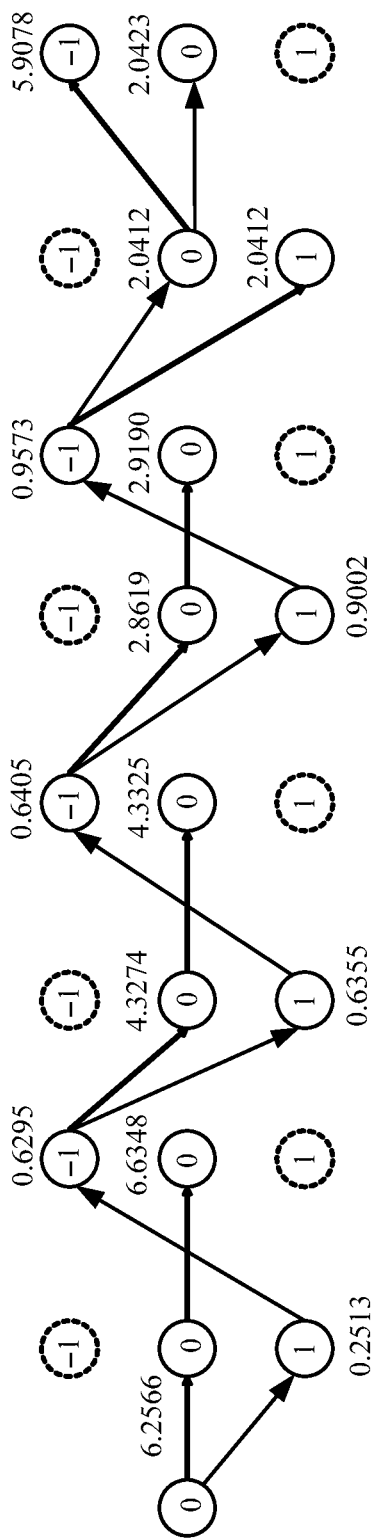
FIG. 8 is a schematic diagram of a correction path according to this application.

S13. Based on the method in S12, by analogy, calculate a metric value of a correction path used to track back to each s[k]. As shown in FIG. 8, calculation results are as follows:

A metric value of a correction path used to track back to the correction value 0 of s[5] is 4.3274, and a correction value sequence corresponding to the correction path is "0, 1, −1, 0".

A metric value of a correction path used to track back to the correction value 1 of s[5] is 0.6355, and a correction value sequence corresponding to the correction path is "0, 1, −1, 1".

A metric value of a correction path used to track back to the correction value 0 of s[4] is 4.3325, and a correction value sequence corresponding to the correction path is "0, 1, −1, 0, 0".

A metric value of a correction path used to track back to the correction value −1 of s[4] is 0.6405, and a correction value sequence corresponding to the correction path is "0, 1, −1, 1, −1".

A metric value of a correction path used to track back to the correction value 0 of s[3] is 2.8619, and a correction value sequence corresponding to the correction path is "0, 1, −1, 1, −1, 0".

A metric value of a correction path used to track back to the correction value 1 of s[3] is 0.9002, and a correction value sequence corresponding to the correction path is "0, 1, −1, 1, −1, 1".

A metric value of a correction path used to track back to the correction value 0 of s[2] is 2.9190, and a correction value sequence corresponding to the correction path is "0, 1, −1, 1, −1, 0, 0".

A metric value of a correction path used to track back to the correction value −1 of s[2] is 0.9574, and a correction value sequence corresponding to the correction path is "0, 1, −1, 1, −1, 1, −1".

A metric value of a correction path used to track back to the correction value 0 of s[1] is 2.0412, and a correction value sequence corresponding to the correction path is "0, 1, −1, 1, −1, 1, −1, 0".

A metric value of a correction path used to track back to the correction value 1 of s[1] is 0.9574, and a correction value sequence corresponding to the correction path is "0, 1, −1, 1, −1, 1, −1, 1".

A metric value of a correction path used to track back to the correction value 0 of s[0] is 2.0423, and a correction value sequence corresponding to the correction path is "0, 1, −1, 1, −1, 1, −1, 0, 0".

A metric value of a correction path used to track back to the correction value −1 of s[0] is 5.9078, and a correction value sequence corresponding to the correction path is "0, 1, −1, 1, −1, 1, −1, 0, −1".

S14. After backtracking to s[0], because the correction path on which the correction value 0 of s[0] is located is a minimum, it is determined that the correction value sequence "0, 1, −1, 1, −1, 1, −1, 0, 0" corresponding to the path is a final correction value sequence.

S15. Correct a cached decision signal sequence based on the correction value sequence "0, 1, −1, 1, −1, 1, −1, 0, 0". Corrected values are shown in Table 4:

TABLE 4

| k | Input signal (x) | Equalized output signal (y) | Decision signal (s) | Original signal | Difference (e) |
|---|---|---|---|---|---|
| 0 | −0.1970 | 2.8030 | 3 | 3 | 0.1970 |
| 1 | 5.9664 | 2.9664 | 3 | 3 | 0.0336 |
| 2 | 1.0411 | −1.9589 | −3 | −3 | 0.9589 |
| 3 | −4.2390 | −3.2390 | −1 | −1 | 0.2390 |
| 4 | −4.5096 | −1.5096 | −3 | −3 | 0.5096 |
| 5 | −2.0712 | −1.0712 | 1 | 1 | 0.0712 |
| 6 | −0.0770 | 0.9230 | −1 | −1 | 0.0770 |
| 7 | 1.3850 | 0.3850 | 3 | 3 | 0.6150 |
| 8 | 6.5013 | 5.5013 | 3 | 3 | −2.5013 |

Based on the correction value sequence "0, 1, −1, 1, −1, 1, −1, 0, 0", the error correction apparatus does not correct s[8], s[1], and s[0], where s[8], s[1], and s[0] are still 3, corrects s[7] upward by one level to 3, corrects s[6] downward by one level to −1, corrects s[5] upward by one level to 1, corrects s[4] downward by one level to −3, corrects s[3] upward by one level to −1, and corrects s[2] downward by one level to −3. A corrected decision signal s'[k] is the same as the original signal. Therefore, error correction succeeds.

Optionally, for the foregoing manner (1), the error correction apparatus may further detect an original signal sequence by using the maximum likelihood sequence estimation algorithm.

A (1+αD) channel under PAM-4 modulation is used as an example below to describe an example of a specific process of detecting the original signal sequence by using the maximum likelihood sequence estimation algorithm.

It is assumed that α=1, the channel response length L=2, the channel response is {h[0], h[1]}={1, α}={1, 1}, J=8, and ε*α*dlevel=1.0. The error correction apparatus sequentially receives the input signal x[k], the output equalization signal y[k], the decision signal s[k], and the difference e[k] located in the $0^{th}$ to $8^{th}$ symbol periods, and performs caching in a sequence of receiving, where k=0, 1, 2, . . . , and 8. Values of x[k], y[k], s[k], and e[k] cached in the $0^{th}$ to $8^{th}$ symbol periods are shown in Table 5:

TABLE 5

| k | Input signal (x) | Equalized output signal (y) | Decision signal (s) | Original signal | Difference (e) |
|---|---|---|---|---|---|
| 0 | 0.0806 | −2.9194 | −3 | −3 | −0.0806 |
| 1 | −4.0338 | −1.0338 | −1 | −1 | 0.0338 |
| 2 | −0.6712 | 0.3288 | 1 | −1 | 0.6712 |
| 3 | 1.7467 | 0.7467 | 1 | 3 | 0.2533 |
| 4 | 2.2046 | 1.2046 | 1 | −1 | 10.2046 |
| 5 | 2.1523 | 1.1523 | 1 | 3 | −0.1523 |
| 6 | −0.1826 | −1.1826 | −1 | −3 | 0.1826 |
| 7 | −2.3315 | −1.3315 | −1 | 1 | 0.3315 |
| 8 | 4.1517 | 5.1517 | 3 | 3 | −2.1517 |

The original signal in Table 5 is a signal that the transmitter needs to send to the receiver, that is, a decision signal that should be obtained after the DFE decides the equalized output signal. It can be learned from Table 5 that decision signals located in the $2^{nd}$ to $7^{th}$ symbol periods have burst errors, and are different from original signals.

After obtaining each x[k], y[k], s[k], and e[k] in Table 5, the error correction apparatus detects, by using the detection condition in Manner 1 or Manner 2, whether the current symbol period is the symbol location of the end of burst error.

Assuming that Manner 2 is used an example, the error correction apparatus detects that the equalized output signal y[8] located in the $8^{th}$ symbol period=5.1517>3+1.3=4.3, that is, meets the condition F. Therefore, the error correction apparatus determines EoBE=8, in other words, the $8^{th}$ symbol period is the symbol location of the end of burst error, so that the error correction apparatus may start detecting the original signal sequence by using the maximum likelihood sequence estimation algorithm.

S20. s[EoBE]=s[8] does not need to be corrected, and is always 3. A value set of each of remaining corrected decision signals s'[k] is {−3, −1, 1, 3}. In this example, a status number 0 corresponds to the level value −3, a status number 1 corresponds to the level value −1, a status number 2 corresponds to the level value 1, and a status number 3 corresponds to the level value 3.

The status number 3 of s[8] is used as a start point, and a status number set of the corrected s[EoBE−1], that is, s'[7] is {0, 1, 2, 3}. Therefore, there are four branch paths between s[8] and s'[7], which are branch paths "3 to 0", "3 to 1", "3 to 2", and "3 to 3" respectively.

S21. Calculate a metric value of a sequence path between s[8] and s'[7] according to Formula 1. For example, a value keeps three decimal places.

Because a signal sequence corresponding to the branch path "3 to 0" is {3, −3}, a metric value of the branch path "3 to 0" is ((3*1+(−3)*1)−4.1517)^2=17.237.

Because a signal sequence corresponding to the branch path "3 to 1" is {3, −1}, a metric value of the branch path "3 to 1" is ((3*1+(−1)*1)−4.1517)^2=4.630.

Because a signal sequence corresponding to the branch path "3 to 2" is {3, 1}, a metric value of the branch path "3 to 2" is ((3*1+1*1)−4.1517)^2=0.023.

Because a signal sequence corresponding to the branch path "3 to 3" is {3, 3}, a metric value of the branch path "3 to 3" is ((3*1+3*1)−4.1517)^2=3.416.

Because a status number of s[EoBE] is always 3 at the EoBE, the four branch paths between s[8] and s'[7] are four sequence paths on which four status numbers of s'[7] are used as end points.

S23. Because status number sets of both s'[7] and s'[6] are {−3, −1, 1, 3}, there are 16 branch paths between s'[7] and s'[6]. There are four branch paths on which a status number 0 of s'[6] is used as an end point, which are branch paths "0 to 0", "1 to 0", "2 to 0", and "3 to 0" respectively.

Metric values of the four branch paths on which the status number 0 of s'[6] is used as the end point are calculated according to Formula 1.

Because a sequence corresponding to the branch path "0 to 0" is {−3, −3}, a metric value of the branch path "0 to 0" is $(((-3)*1+(-3)*1)-(-2.3315))^2=13.458$.

Because a sequence corresponding to the branch path "1 to 0" is {−1, −3}, a metric value of the branch path "1 to 0" is $(((-1)*1+(-3)*1)-(-2.3315))^2=2.784$.

Because a sequence corresponding to the branch path "2 to 0" is {+1, −3}, a metric value of the branch path "2 to 0" is $(((+1)*1+(-3)*1)-(-2.3315))^2=0.110$.

Because a sequence corresponding to the branch path "3 to 0" is {+3, −3}, a metric value of the branch path "3 to 0" is $(((+3)*1+(-3)*1)-(-2.3315))^2=5.436$.

Then, the metric value 13.458 of the branch path "0 to 0" is superimposed on the metric value 17.237 of the sequence path on which a status number 0 of s'[7] is used as an end point, to obtain a metric value 7.4139 of a first sequence path on which the status number 0 of s'[6] is used as the end point. A signal sequence corresponding to the first sequence path on which the status number 0 of s'[6] is used as the end point is {3, −3, −3}.

The metric value 2.784 of the branch path "1 to 0" is superimposed on the metric value 4.630 of the sequence path on which a status number 1 of s'[7] is used as an end point, to obtain a metric value 7.4139 of a second sequence path on which the status number 0 of s'[6] is used as the end point. A signal sequence corresponding to the second sequence path on which the status number 0 of s'[6] is used as the end point is {3, −1, −3}.

The metric value 0.110 of the branch path "2 to 0" is superimposed on the metric value 0.023 of the sequence path on which a status number 2 of s'[7] is used as an end point, to obtain a metric value 0.133 of a third sequence path on which the status number 0 of s'[6] is used as the end point. A signal sequence corresponding to the third sequence path on which the status number 0 of s'[6] is used as the end point is {3, 1, −3}.

The metric value 5.436 of the branch path "3 to 0" is superimposed on the metric value 5.436 of the sequence path on which a status number 3 of s'[7] is used as an end point, to obtain a metric value 8.852 of a fourth sequence path on which the status number 0 of s'[6] is used as the end point. A signal sequence corresponding to the fourth sequence path on which the status number 0 of s'[6] is used as the end point is {3, 3, −3}.

It can be learned from comparison that in the four sequence paths on which the status number 0 of s'[6] is used as the end point, the metric value 0.133 of the third sequence path is a minimum. Therefore, the metric value of the third sequence path on which the status number 0 of s'[6] is used as the end point and the corresponding signal sequence are recorded.

Figure 9:
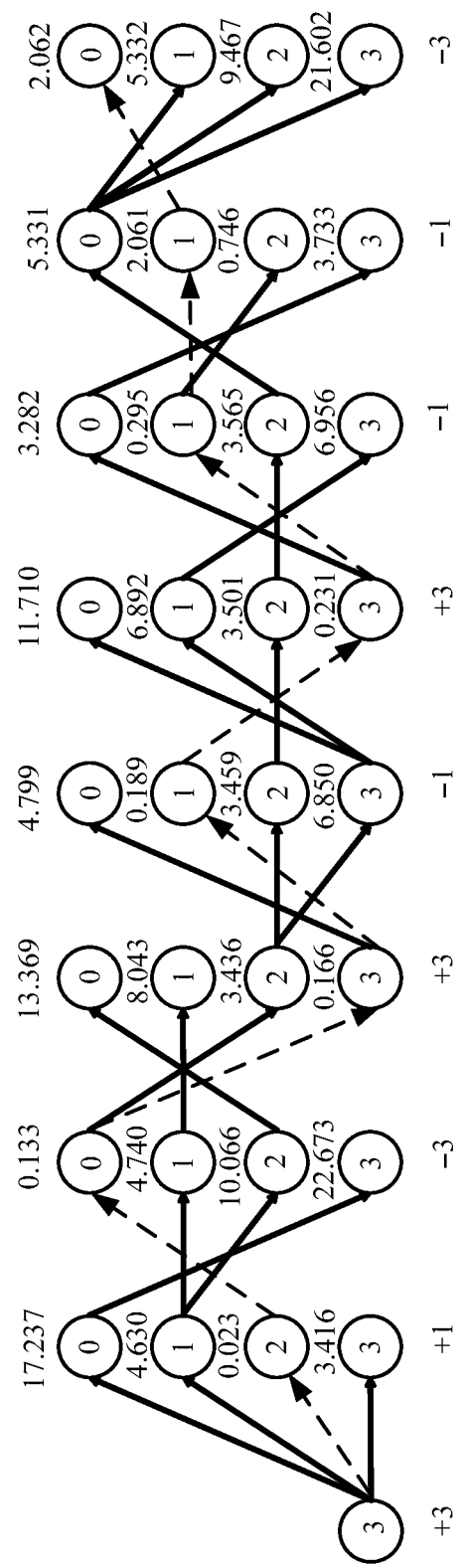
FIG. 9 is a schematic diagram of a sequence path according to this application.

S24. Calculate, by using a same processing method, a metric value of a sequence path on which a status number 1 of s'[6] is used as an end point, a metric value of a sequence path on which a status number 2 of s'[6] is used as an end point, and a metric value of a sequence path on which a status number 3 of s'[6] is used as an end point. Then, perform forward backtracking based on a metric value of each sequence path of s'[6] until a metric value of each sequence path of s'[0] is obtained. A result is shown in FIG. 9.

The metric value of the sequence path on which the status number 1 of s'[6] is used as the end point is 4.740, and a signal sequence corresponding to the sequence path is {3, −1, −1}.

The metric value of the sequence path on which the status number 2 of s'[6] is used as the end point is 10.066, and a signal sequence corresponding to the sequence path is {3, −1, 1}.

The metric value of the sequence path on which the status number 3 of s'[6] is used as the end point is 22.673, and a signal sequence corresponding to the sequence path is {3, −3, 3}.

A metric value of a sequence path on which a status number 0 of s'[5] is used as an end point is 13.369, and a signal sequence corresponding to the sequence path is {3, −1, 1, −3}.

A metric value of a sequence path on which a status number 1 of s'[5] is used as an end point is 8.043, and a signal sequence corresponding to the sequence path is {3, −1, −1, −1}.

A metric value of a sequence path on which a status number 2 of s'[5] is used as an end point is 3.436, and a signal sequence corresponding to the sequence path is {3, 1, −3, 1}.

A metric value of a sequence path on which a status number 3 of s'[5] is used as an end point is 0.166, and a signal sequence corresponding to the sequence path is {3, −1, −3, 3}.

A metric value of a sequence path on which a status number 0 of s'[4] is used as an end point is 4.799, and a signal sequence corresponding to the sequence path is {3, −1, −3, 3, −3}.

A metric value of a sequence path on which a status number 1 of s'[4] is used as an end point is 0.189, and a signal sequence corresponding to the sequence path is {3, −1, −3, 3, −1}.

A metric value of a sequence path on which a status number 2 of s'[4] is used as an end point is 3.460, and a signal sequence corresponding to the sequence path is {3, 1, −3, 1, 1}.

A metric value of a sequence path on which a status number 3 of s'[4] is used as an end point is 6.850, and a signal sequence corresponding to the sequence path is {3, 1, −3, 1, 3}.

A metric value of a sequence path on which a status number 0 of s'[3] is used as an end point is 11.710, and a signal sequence corresponding to the sequence path is {3, 1, −3, 1, 3, −3}.

A metric value of a sequence path on which a status number 1 of s'[3] is used as an end point is 6.892, and a signal sequence corresponding to the sequence path is {3, 1, −3, 1, 3, −1}.

A metric value of a sequence path on which a status number 2 of s'[3] is used as an end point is 3.501, and a signal sequence corresponding to the sequence path is {3, 1, −3, 1, 1, 1}.

A metric value of a sequence path on which a status number 3 of s'[3] is used as an end point is 0.231, and a signal sequence corresponding to the sequence path is {3, 1, −3, 3, −1, 3}.

A metric value of a sequence path on which a status number 0 of s'[2] is used as an end point is 3.282, and a signal sequence corresponding to the sequence path is {3, 1, −3, 3, −1, 3, −3}.

A metric value of a sequence path on which a status number 1 of s'[2] is used as an end point is 0.295, and a signal sequence corresponding to the sequence path is {3, 1, −3, 3, −1, 3, −1}.

A metric value of a sequence path on which a status number 2 of s'[2] is used as an end point is 3.565, and a signal sequence corresponding to the sequence path is {3, 1, −3, 1, 1, 1, 1}.

A metric value of a sequence path on which a status number 3 of s'[2] is used as an end point is 6.956, and a signal sequence corresponding to the sequence path is {3, 1, −3, 1, 3, −1, −1}.

A metric value of a sequence path on which a status number 0 of s'[1] is used as an end point is 5.331, and a signal sequence corresponding to the sequence path is {3, 1, −3, 1, 1, 1, 1, −3}.

A metric value of a sequence path on which a status number 1 of s'[1] is used as an end point is 2.0612, and a signal sequence corresponding to the sequence path is {3, 1, −3, 3, −1, 3, −1, −1}.

A metric value of a sequence path on which a status number 2 of s'[1] is used as an end point is 0.746, and a signal sequence corresponding to the sequence path is {3, 1, −3, 3, −1, 3, −1, 1}.

A metric value of a sequence path on which a status number 3 of s'[1] is used as an end point is 3.733, and a signal sequence corresponding to the sequence path is {3, 1, −3, 3, −1, 3, −3, 3}.

A metric value of a sequence path on which a status number 0 of s'[0] is used as an end point is 2.062, and a signal sequence corresponding to the sequence path is {3, 1, −3, 3, −1, 3, −1, −1, −3}.

A metric value of a sequence path on which a status number 1 of s'[0] is used as an end point is 5.332, and a signal sequence corresponding to the sequence path is {3, 1, −3, 1, 1, 1, 1, −3, −1}.

A metric value of a sequence path on which a status number 2 of s'[0] is used as an end point is 9.467, and a signal sequence corresponding to the sequence path is {3, 1, −3, 1, 1, 1, 1, −3, 1}.

A metric value of a sequence path on which a status number 3 of s'[0] is used as an end point is 21.602, and a signal sequence corresponding to the sequence path is {3, 1, −3, 1, 1, 1, 1, −3, 3}.

S25. The metric value of the sequence path on which the status number 0 of s'[0] is used as the end point is a minimum based on sequence paths on which four status numbers of s'[0] are used as end points. Therefore, it is determined that a cached decision sequence is replaced with the signal sequence {3, 1, −3, 3, −1, 3, −1, −1, −3} corresponding to the sequence path on which the status number 0 of s'[0] is used as the end point. A result after replacement is shown in Table 6:

TABLE 6

| k | Input signal (x) | Equalized output signal (y) | Decision signal (s) | Original signal | Difference (e) |
|---|---|---|---|---|---|
| 0 | 0.0806 | −2.9194 | −3 | −3 | −0.0806 |
| 1 | −4.0338 | −1.0338 | −1 | −1 | 0.0338 |
| 2 | −0.6712 | 0.3288 | −1 | −1 | 0.6712 |
| 3 | 1.7467 | 0.7467 | 3 | 3 | 0.2533 |
| 4 | 2.2046 | 1.2046 | −1 | −1 | 10.2046 |
| 5 | 2.1523 | 1.1523 | 3 | 3 | −0.1523 |
| 6 | −0.1826 | −1.1826 | −3 | −3 | 0.1826 |

TABLE 6-continued

| k | Input signal (x) | Equalized output signal (y) | Decision signal (s) | Original signal | Difference (e) |
|---|---|---|---|---|---|
| 7 | −2.3315 | −1.3315 | 1 | 1 | 0.3315 |
| 8 | 4.1517 | 5.1517 | 3 | 3 | −2.1517 |

The corrected decision signal is the same as the original signal. Therefore, current error correction succeeds. To be specific, the original signal sequence is successfully detected by using the error correction method provided in this application.

Optionally, the error correction apparatus performs the backtracking error correction on the J decision signals by using the ECC of the input signal in Manner (2) of the backtracking error correction. For example, a specific implementation process of Manner (2) may be as follows:

(1) The error correction apparatus obtains the error pattern of the decision signal s[EoBE−1] located in the (EoBE−1)$^{th}$ symbol period based on the feature of the difference e[EoBE] at the EoBE, and then corrects s[EoBE−1] based on the error pattern of s[EoBE−1], to obtain a corrected decision signal s'[EoBE−1].

If e[EoBE]>0, the error pattern of s[EoBE−1] is 1, and therefore s[EoBE−1] needs to be corrected downward by one level. If e[EoBE]<0, the error pattern of s[EoBE−1] is −1, and therefore s[EoBE−1] needs to be corrected upward by one level.

(2) The error correction apparatus calculates an ECC codeword sequence based on a new decision signal sequence after determining s'[EoBE−1].

(3) An ECC codeword at the EoBE is checked to determine whether the ECC codeword is valid. If the check succeeds, the error correction is completed. If the verification fails, S33 continues to be performed.

(4) s[EoBE−2] is corrected by one level in a direction opposite to an error correction direction of s'[EoBE−1]. For example, if s'[EoBE−1] is corrected upward by one level, s[EoBE−2] is corrected downward by one level. If s'[EoBE−1] is corrected downward by one level, s[EoBE−2] is corrected upward by one level. After s'[EoBE−2] is determined, the ECC codeword sequence is re-determined, and whether the ECC codeword at the EoBE is valid is checked.

(5) Backtracking error correction is sequentially performed on the cached s[k] based on a method in S33 until the ECC codeword at the EoBE is valid. If the ECC codeword at the EoBE is still invalid in an ECC codeword sequence determined based on s'[EoBE−J] after s[EoBE−J] is corrected, all cached s[k] is not corrected.

In this example, the ECC codeword may be a CRC check code or an error correction code such as an RS error correction code or a BCH error correction code. When the ECC and FEC are used together, a coding gain can be increased. For example, Table 7 is an example of an ECC codeword applied to the error correction apparatus, and an example of an FEC codeword used together with the ECC provided in this application.

TABLE 7

| FEC | ECC | ECC codeword | Combination gain (%) of ECC & FEC |
|---|---|---|---|
| RS(528, 514) | CRC-32 | 1056/1088 | 5.84% |
| | CRC-16 | 528/544 | |
| | CRC-8 | 264/272 | |
| | CRC-4 | 132/136 | |

TABLE 7-continued

| FEC | ECC | ECC codeword | Combination gain (%) of ECC & FEC |
|---|---|---|---|
| RS(544, 514) | CRC-32 | 1088/1120 | 8.95% |
| | CRC-16 | 544/560 | |
| | CRC-8 | 272/280 | |
| | CRC-4 | 136/140 | |
| RS(560, 514) | CRC-32 | 1120/1152 | 12.06% |
| | CRC-16 | 560/576 | |
| | CRC-8 | 280/288 | |
| | CRC-4 | 140/144 | |
| . . . | . . . | . . . | . . . |

It should be noted that ECC codeword types in Table 7 are merely shown as an example, and are not all ECC codewords that can be selected in the error correction method provided in this application.

Optionally, in Manner (3) of the backtracking error correction, the error correction apparatus performs the backtracking error correction on the J decision signals based on the input signal and the difference in the direct detection manner, to obtain the correct decision signal sequence. For example, a specific implementation process of Manner (3) may be as follows:

(1) The error correction apparatus determines the correction value of the decision signal s[EoBE−1] located in the (k=EoBE−1)$^{th}$ symbol period based on the feature of the difference e[EoBE] or the feature of the decision signal s[EoBE] at the EoBE, and corrects s[EoBE−1] based on the correction value, to obtain the corrected decision signal s'[EoBE−1].

For example, when s[EoBE]=the maximum level value, s[EoBE−1] needs to be corrected upward by one level. When s[EoBE]=the minimum level value, s[EoBE−1] needs to be corrected downward by one level.

Optionally, if the feature of the difference is used as the determining criterion, when e[EoBE]<0, s[EoBE−1] needs to be corrected downward by one level. When e[EoBE]>0, s[EoBE−1] needs to be corrected upward by one level.

(2) The error correction apparatus recalculates a difference e'[EoBE−1] located in the (EoBE−1)$^{th}$ symbol period based on s'[EoBE−1] by using Formula 2, and determines whether e'[EoBE−1] meets the condition A, that is, determines whether |e'[EoBE−1]|>ε*α*dlevel is valid.

$$e'[k]=x[k]-(s'[k]\cdot h[0]+s'[k-1]\cdot h[1]) \quad \text{(Formula 2)}$$

If e'[EoBE−1] meets the condition A, the error correction is completed. If e'[EoBE−1] does not meet the condition A, a step in (3) is performed.

(3) The error correction apparatus corrects s[EoBE−2] by one level in a direction opposite to an error correction direction of s'[EoBE−1]. For example, if s'[EoBE−1] is corrected upward by one level, s[EoBE−2] is corrected downward by one level. If s'[EoBE−1] is corrected downward by one level, s[EoBE−2] is corrected upward by one level. After s'[EoBE−2] is determined, a difference e'[EoBE−2] of the (EoBE−2)$^{th}$ symbol period is recalculated, and whether |e'[EoBE−2]|>ε*α*dlevel is valid is determined.

(4) By using the method in (2) and (3), backtracking is sequentially performed on the J decision signals that are before the EoBE and that are cached in the error correction apparatus, until an updated difference obtained after a decision signal and a difference of a particular symbol period are updated does not meet the condition A, or the J decision signals are all corrected.

The (1+αD) channel under the PAM-4 modulation is used as an example below to describe an example of a specific process of (1) to (4).

It is assumed that α=1, the channel response length L=2, the channel response is {h[0], h[1]}={1, α}={1, 1}, and J=8. The error correction apparatus sequentially receives the input signal x[k], the output equalization signal y[k], the decision signal s[k], and the difference e[k] located in the 0$^{th}$ to 8$^{th}$ symbol periods, and performs caching in a sequence of receiving, where k=0, 1, 2, . . . , and 8. Values of x[k], y[k], s[k], and e[k] cached in the 0$^{th}$ to 8$^{th}$ symbol periods are shown in Table 8:

TABLE 8

| k | Input signal (x) | Equalized output signal (y) | Decision signal (s) | Original signal | Difference (e) |
|---|---|---|---|---|---|
| 0 | −0.0377 | −3.0377 | −3 | −3 | 0.0377 |
| 1 | −2.1528 | 0.8472 | 1 | 1 | 0.1528 |
| 2 | −0.9963 | −1.9964 | −1 | −3 | 0.9963 |
| 3 | 0.2677 | 1.2677 | 1 | 3 | −0.2677 |
| 4 | 1.5404 | 0.5404 | 1 | −1 | 0.4596 |
| 5 | 1.7793 | 0.7793 | 1 | 3 | 0.2207 |
| 6 | 2.1502 | 1.1502 | 1 | −1 | −0.1502 |
| 7 | 1.5025 | 0.5025 | 1 | 3 | 0.4975 |
| 8 | 6.2190 | 5.2190 | 3 | 3 | −2.2190 |

After obtaining each x[k], y[k], s[k], and e[k] in Table 8, the error correction apparatus detects, by using the detection condition in Manner 1 or Manner 2, whether a current symbol period is the symbol location of the end of burst error.

Assuming that Manner 1 is used as an example, the error correction apparatus detects that a difference e[8] and a decision signal s[8] in the 8$^{th}$ symbol period meet the detection condition in Manner 1. That is, 1-2.21901>1.3, and s[8]=3. Therefore, the error correction apparatus determines EoBE=8, in other words, the 8$^{th}$ symbol period is the symbol location of the end of burst error, so that the error correction apparatus may start performing backtracking error correction on eight decision signals before the 8$^{th}$ symbol period based on the input signal and the difference in the direct detection manner, that is, tracking from s[8] back to s[7], s[6], . . . , and s[0] for error correction. For example, a specific process is as follows:

S30. Because s[EoBE]=3, that is, s[EoBE]=the maximum level value, the error correction apparatus determines that s[EoBE−1] needs to be corrected upward by one level.

S31. The error correction apparatus corrects s[EoBE−1]=s[7]=1 upward by one level, and therefore a corrected decision signal s'[7] in the 7$^{th}$ symbol period=3.

S32. The error correction apparatus substitutes x[7]=1.5025, s'[7]=3, s[6]=1, h[0]=1, and h[1]=1 into Formula 2, and obtains e'[7] through calculation. A specific calculation process is as follows:

$$e'[7]=x[7]-(s'[7]\cdot h[0]+s[6]\cdot h[1])=1.5025-[3\cdot 1+1\cdot 1]= -2.4975$$

After s'[7] and e'[7] are updated, values of x[k], y[k], s[k], and e[k] cached in the 0$^{th}$ to 8$^{th}$ symbol periods are shown in Table 9:

TABLE 9

| k | Input signal (x) | Equalized output signal (y) | Decision signal (s) | Original signal | Difference (e) |
|---|---|---|---|---|---|
| 0 | −0.0377 | −3.0377 | −3 | −3 | 0.0377 |
| 1 | −2.1528 | 0.8472 | 1 | 1 | 0.1528 |
| 2 | −0.9963 | −1.9964 | −1 | −3 | 0.9963 |
| 3 | 0.2677 | 1.2677 | 1 | 3 | −0.2677 |
| 4 | 1.5404 | 0.5404 | 1 | −1 | 0.4596 |
| 5 | 1.7793 | 0.7793 | 1 | 3 | 0.2207 |
| 6 | 2.1502 | 1.1502 | 1 | −1 | −0.1502 |
| 7 | 1.5025 | 0.5025 | 3 | 3 | −2.4975 |
| 8 | 6.2190 | 5.2190 | 3 | 3 | −2.2190 |

S33. Because $|e'[7]| > \varepsilon * \alpha * dlevel$ is valid, that is, $e'[7]$ meets the condition A, the error correction apparatus performs error correction on s[6] in an error correction manner of s'[7]. That is, s[6]=1 is corrected downward by one level, to obtain s'[6]=−1. Then, x[6]=2.1502, s'[6]=−1, s[5]=1, h[0]=1, and h[1]=1 are substituted into Formula 2, to obtain e'[6]=2.1502 through calculation.

After s'[6] and e'[6] are updated, values of x[k], y[k], s[k], and e[k] cached in the $0^{th}$ to $8^{th}$ symbol periods are shown in Table 10:

TABLE 10

| k | Input signal (x) | Equalized output signal (y) | Decision signal (s) | Original signal | Difference (e) |
|---|---|---|---|---|---|
| 0 | −0.0377 | −3.0377 | −3 | −3 | 0.0377 |
| 1 | −2.1528 | 0.8472 | 1 | 1 | 0.1528 |
| 2 | −0.9963 | −1.9964 | −1 | −3 | 0.9963 |
| 3 | 0.2677 | 1.2677 | 1 | 3 | −0.2677 |
| 4 | 1.5404 | 0.5404 | 1 | −1 | 0.4596 |
| 5 | 1.7793 | 0.7793 | 1 | 3 | 0.2207 |
| 6 | 2.1502 | 1.1502 | −1 | −1 | 2.1502 |
| 7 | 1.5025 | 0.5025 | 3 | 3 | 0.4975 |
| 8 | 6.2190 | 5.2190 | 3 | 3 | −2.2190 |

S34. By using the same method as that in S33, backtracking is sequentially performed on the cached eight decision signals and differences until e'[k] of a particular symbol period does not meet the condition A, or s'[0] is corrected. A specific process is as follows:

Because $|e'[6]| > \varepsilon * \alpha * dlevel$ is valid, that is, $e'[6]$ meets the condition A, the error correction apparatus corrects s[5]=1 upward by one level in an error correction manner of s'[6], to obtain s'[5]=3, and then obtains e'[5]=−2.2208 through calculation by using Formula 2.

After s'[5] and e'[5] are updated, values of x[k], y[k], s[k], and e[k] cached in the $0^{th}$ to $8^{th}$ symbol periods are shown in Table 11:

TABLE 11

| k | Input signal (x) | Equalized output signal (y) | Decision signal (s) | Original signal | Difference (e) |
|---|---|---|---|---|---|
| 0 | −0.0377 | −3.0377 | −3 | −3 | 0.0377 |
| 1 | −2.1528 | 0.8472 | 1 | 1 | 0.1528 |
| 2 | −0.9963 | −1.9964 | −1 | −3 | 0.9963 |
| 3 | 0.2677 | 1.2677 | 1 | 3 | −0.2677 |
| 4 | 1.5404 | 0.5404 | 1 | −1 | 0.4596 |
| 5 | 1.7793 | 0.7793 | 3 | 3 | −2.2208 |
| 6 | 2.1502 | 1.1502 | −1 | −1 | −0.1502 |
| 7 | 1.5025 | 0.5025 | 3 | 3 | 0.4975 |
| 8 | 6.2190 | 5.2190 | 3 | 3 | −2.2190 |

Because $|e'[5]| > \varepsilon * \alpha * dlevel$ is valid, that is, $e'[5]$ meets the condition A, the error correction apparatus corrects s[4]=1 downward by one level in an error correction manner of s'[5], to obtain s'[4]=−1, and then obtains e'[4]=1.5404 through calculation by using Formula 2.

After s'[4] and e'[4] are updated, values of x[k], y[k], s[k], and e[k] cached in the $0^{th}$ to $8^{th}$ symbol periods are shown in Table 12:

TABLE 12

| k | Input signal (x) | Equalized output signal (y) | Decision signal (s) | Original signal | Difference (e) |
|---|---|---|---|---|---|
| 0 | −0.0377 | −3.0377 | −3 | −3 | 0.0377 |
| 1 | −2.1528 | 0.8472 | 1 | 1 | 0.1528 |
| 2 | −0.9963 | −1.9964 | −1 | −3 | 0.9963 |
| 3 | 0.2677 | 1.2677 | 1 | 3 | −0.2677 |
| 4 | 1.5404 | 0.5404 | −1 | −1 | 1.5404 |
| 5 | 1.7793 | 0.7793 | 3 | 3 | −0.2207 |
| 6 | 2.1502 | 1.1502 | −1 | −1 | −0.1502 |
| 7 | 1.5025 | 0.5025 | 3 | 3 | 0.4975 |
| 8 | 6.2190 | 5.2190 | 3 | 3 | −2.2190 |

Because $|e'[4]| > \varepsilon * \alpha * dlevel$ is valid, that is, $e'[4]$ meets the condition A, the error correction apparatus corrects s[3]=1 upward by one level in an error correction manner of s'[4], to obtain s'[3]=3, and then obtains e'[3]=−1.7323 through calculation by using Formula 2.

After s'[3] and e'[3] are updated, values of x[k], y[k], s[k], and e[k] cached in the $0^{th}$ to $8^{th}$ symbol periods are shown in Table 13:

TABLE 13

| k | Input signal (x) | Equalized output signal (y) | Decision signal (s) | Original signal | Difference (e) |
|---|---|---|---|---|---|
| 0 | −0.0377 | −3.0377 | −3 | −3 | 0.0377 |
| 1 | −2.1528 | 0.8472 | 1 | 1 | 0.1528 |
| 2 | −0.9963 | −1.9964 | −1 | −3 | 0.9963 |
| 3 | 0.2677 | 1.2677 | 3 | 3 | −1.7323 |
| 4 | 1.5404 | 0.5404 | −1 | −1 | 0.4596 |
| 5 | 1.7793 | 0.7793 | 3 | 3 | −0.2207 |
| 6 | 2.1502 | 1.1502 | −1 | −1 | −0.1502 |
| 7 | 1.5025 | 0.5025 | 3 | 3 | 0.4975 |
| 8 | 6.2190 | 5.2190 | 3 | 3 | −2.2190 |

Because $|e'[3]| > \varepsilon * \alpha * dlevel$ is valid, that is, $e'[3]$ meets the condition A, the error correction apparatus corrects s[2]=−1 downward by one level in an error correction manner of s'[3], to obtain s'[2]=−3, and then obtains e'[2]= 1.0037 through calculation by using Formula 2.

After s'[2] and e'[2] are updated, values of x[k], y[k], s[k], and e[k] cached in the 0th to $8^{th}$ symbol periods are shown in Table 14:

TABLE 14

| k | Input signal (x) | Equalized output signal (y) | Decision signal (s) | Original signal | Difference (e) |
|---|---|---|---|---|---|
| 0 | −0.0377 | −3.0377 | −3 | −3 | 0.0377 |
| 1 | −2.1528 | 0.8472 | 1 | 1 | 0.1528 |
| 2 | −0.9963 | −1.9964 | −3 | −3 | 1.0037 |
| 3 | 0.2677 | 1.2677 | 3 | 3 | 0.2677 |
| 4 | 1.5404 | 0.5404 | −1 | −1 | 0.4596 |
| 5 | 1.7793 | 0.7793 | 3 | 3 | −0.2207 |
| 6 | 2.1502 | 1.1502 | −1 | −1 | −0.1502 |

TABLE 14-continued

| k | Input signal (x) | Equalized output signal (y) | Decision signal (s) | Original signal | Difference (e) |
|---|---|---|---|---|---|
| 7 | 1.5025 | 0.5025 | 3 | 3 | 0.4975 |
| 8 | 6.2190 | 5.2190 | 3 | 3 | −2.2190 |

Because |e'[2]|>ε*α*dlevel is not valid, s[2] does not need to be corrected. The decision signal sequence cached in the error correction apparatus is corrected to "3, 3, −1, 3, 1, 3, −3, 1, −3", which is the same as the original signal sequence. Therefore, current error correction succeeds.

Figure 10:
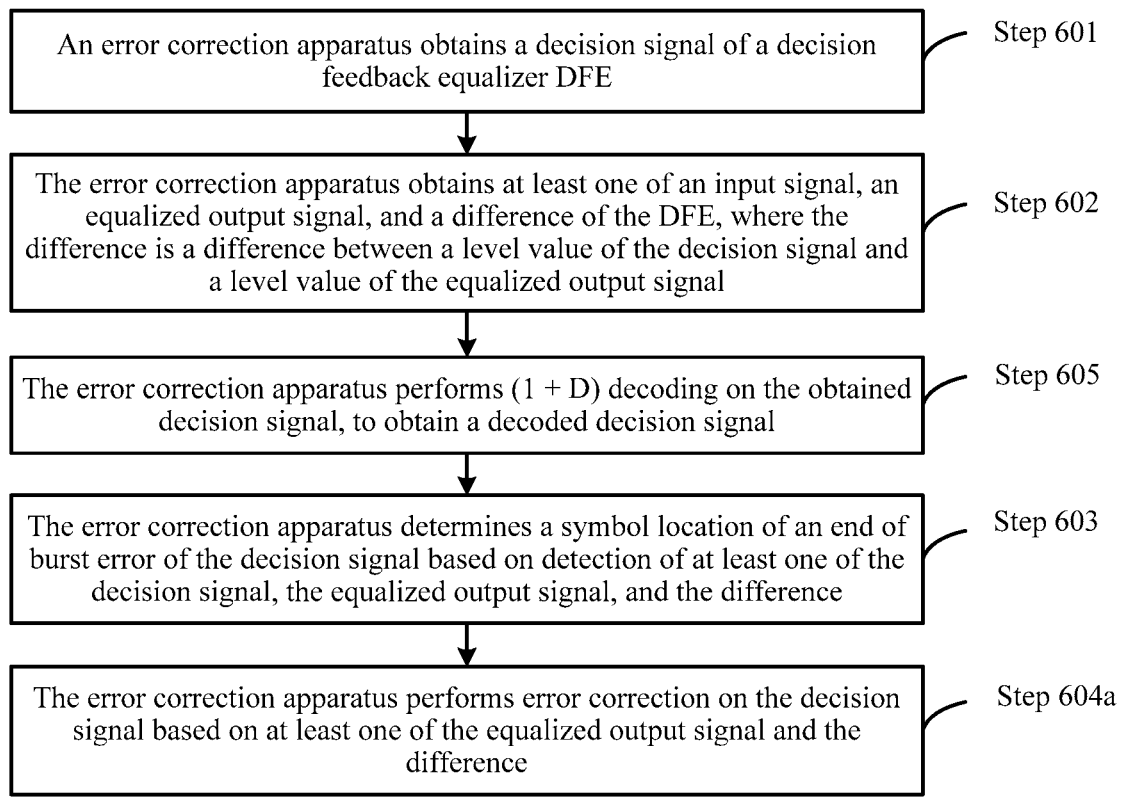
FIG. 10 is a flowchart 2 of an embodiment of an error correction method according to this application.

Optionally, based on FIG. 6, FIG. 10 is a flowchart of an embodiment of an error correction method provided in this application. After step 601, before step 603, the method includes the following step:

Step 605: The error correction apparatus performs (1+D) decoding on the obtained decision signal, to obtain a decoded decision signal.

Step 604 may specifically include:

Step 604a: The error correction apparatus performs error correction on the decision signal based on at least one of the equalized output signal and the difference.

For example, the error correction apparatus may determine, based on the feature of the decision signal s[EoBE] at the EoBE, an error pattern of the decision signal obtained after the (1+D) decoding at the EoBE.

For example, when s[EoBE]=the maximum level value, the error pattern of the decision signal obtained after the (1+D) decoding at the EoBE is −1, and therefore there is a need to correct upward by one level. When s[EoBE]=the minimum level value, the error pattern is 1, and therefore there is a need to correct downward by one level.

It should be noted that, in the foregoing various embodiments provided in this application, although the (1+αD) channel under the PAM-4 modulation and the DFE with a quantity 1 of taps are used as an example for description, the error correction method provided in this application may also be applied to any PAM-N modulation scenario such as PAM-1, PAM-2, or PAM-3 and a modulation scenario such as QPSK or QAM, and is also applied to a DFE with any quantity of taps. An implementation process is similar to the various embodiments provided in this application, and details are not described herein again.

It should be noted that, by using the error correction method provided in this application, the bit error transfer feature of the DFE is used to detect the symbol location of the end of burst error caused by the DFE, and correct the erroneous decision signal, so as to reduce a bit error rate of the DFE and improve equalization performance.

In addition, under a normal working condition, a probability of a DFE burst error is relatively low. For example, one error occurs in a case of more than 1000 bits on average under a 1e-3 bit error rate. Therefore, an overall throughput of the error correction apparatus can be greatly reduced. For example, the receiver requires a data throughput of 100 Gbps, but the error correction apparatus actually requires only a throughput of 100 Gbps/1000=100 Mbps.

Figure 11A:
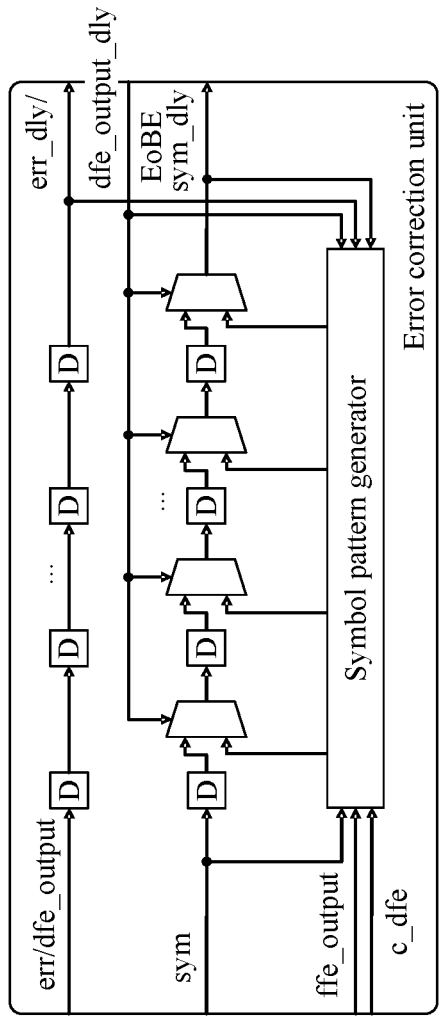
Figure 11B:
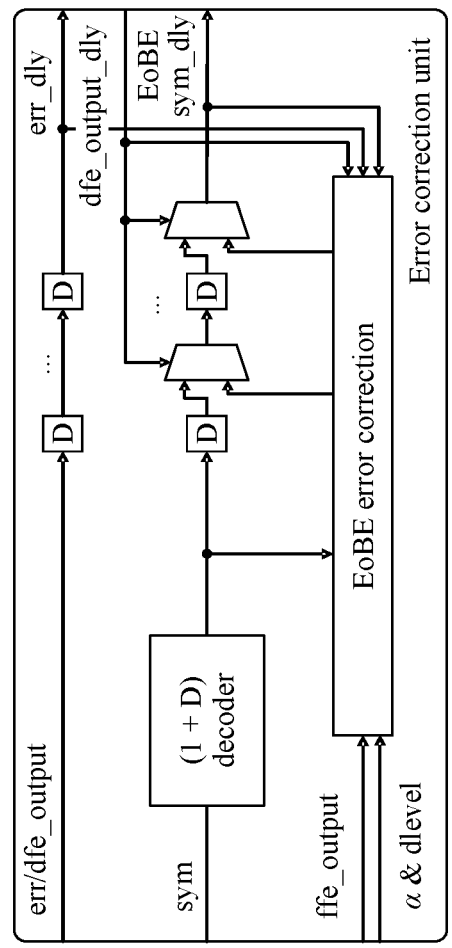

For example, FIG. 11(a) to FIG. 11(c) are schematic diagrams of an error correction principle according to this application, that is, are a schematic diagram of a principle when an error correction unit of an error correction apparatus performs step 604. This application enumerates three possible examples, including principles shown in FIG. 11(a) to FIG. 11(c). A register (D), a symbol pattern generator, and a processing module (indicated by a trapezoid in FIG. 11(a) to FIG. 11(c)) are connected to each other according to a signal flow direction (a direction indicated by an arrow) shown in FIG. 11(a). A signal that may be input to the error correction unit includes an equalized output signal (dfe_output), a difference (err), a decision signal (sym), an EoBE, and a coefficient (c_dfe) of a DFE. A signal that may be output by the error correction apparatus includes a corrected decision signal (sym_dly) and a corrected difference (err dly). A manner (a) can implement the foregoing error correction manner of "using a maximum likelihood sequence estimation algorithm to detect a correction value sequence".

The register, the processing module, and an EoBE error correction module are connected to each other according to a signal flow direction shown in FIG. 11(b). A manner (b) can implement the foregoing error correction manner "based on (1+D) decoding".

The register, the processing module, and an error pattern generator are connected to each other according to a signal flow direction shown in FIG. 11(c). A manner (c) can implement the foregoing error correction manner of "using the maximum likelihood sequence estimation algorithm to detect an original signal sequence" and "direct detection".

Figure 12:
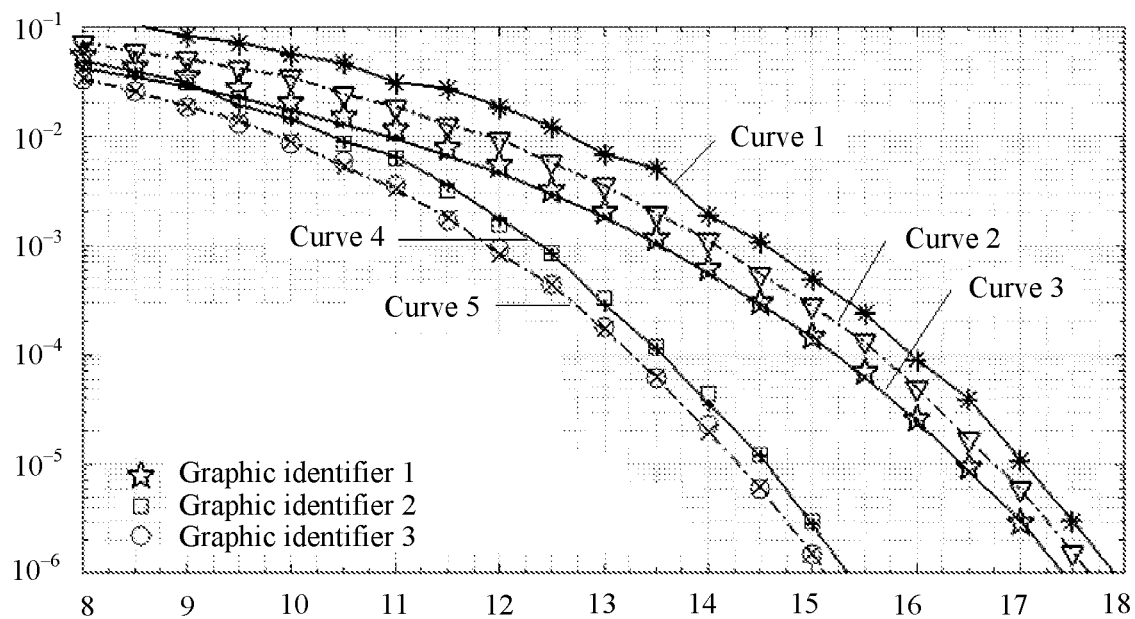
FIG. 12 is a schematic diagram of a comparison of equalization performance according to this application.

FIG. 12 is a schematic diagram of a comparison of equalization performance according to this application. A horizontal axis indicates a signal-to-noise ratio, and a vertical axis indicates a bit error rate. A curve 1 indicates an equalization performance curve of a DFE under a precoding disabled condition based on a (1+D) channel in the prior art. A curve 2 indicates a performance curve of the DFE under a precoding enabled condition based on the (1+D) channel in the prior art. A curve 3 indicates a performance curve of the DFE under an additive white Gaussian noise (AWGN) channel (that is, a (1+αD) channel in a case of α=0) condition in the prior art. A curve 4 indicates a performance curve of an MLSE under the precoding disabled condition based on the (1+D) channel in the prior art. A curve 5 indicates a performance curve of the MLSE under the precoding enabled condition based on the (1+D) channel in the prior art.

A graphic identifier 1 indicates equalization performance data of the DFE based on the (1+D) channel in a manner shown in FIG. 11(b) provided in this application. It can be learned from FIG. 12 that the graphic identifier 1 is distributed at the curve 3. To be specific, after error correction is performed, in an error correction manner "based on (1+D) decoding" provided in this application, on a decision signal output by the DFE, an equalization performance curve of the DFE is close to the performance curve of the DFE under the AWGN channel.

A graphic identifier 2 indicates equalization performance data of the DFE under the precoding disabled condition based on the (1+D) channel in a manner shown in FIG. 11(a) or FIG. 11(c) provided in this application. It can be learned from FIG. 12 that the graphic identifier 2 is distributed at the curve 4. To be specific, after error correction is performed, in an error correction manner shown in FIG. 11(a) or FIG. 11(c) provided in this application, on the decision signal output by the DFE, an equalization performance curve of the DFE under the precoding disabled condition based on the (1+D) channel is close to the performance curve of the MLSE under the precoding disabled condition based on the (1+D) channel.

A graphic identifier 3 indicates equalization performance data of the DFE under the precoding enabled condition based on the (1+D) channel in the manner shown in FIG.

11(a) or FIG. 11(c) provided in this application. It can be learned from FIG. 12 that the graphic identifier 3 is distributed at the curve 5. To be specific, after error correction is performed, in the error correction manner shown in FIG. 11(a) or FIG. 11(c) provided in this application, on the decision signal output by the DFE, an equalization performance curve of the DFE under the precoding enabled condition based on the (1+D) channel is close to the performance curve of the MLSE under the precoding enabled condition based on the (1+D) channel.

It can be learned that compared with an existing DFE (the curve 1 and the curve 2), after an error correction method provided in this application, that is, a manner of the DFE+an error correction apparatus, is used, equalization performance of the DFE is improved.

Regardless of whether a bit error occurs, the MLSE/RSSE runs at full speed. Therefore, complexity and dynamic power consumption of the MLSE/RSSE are very high. However, in the solution of the DFE+the error correction apparatus provided in this application, the error correction apparatus needs to perform error correction once at an interval of more than 1000 bits on average, and a throughput requirement is less than 100 Gbps/1000=0.1 Gbps. Therefore, compared with the technical solution of the MLSE/RSSE, the solution of the DFE+the error correction apparatus provided in this application can greatly reduce implementation complexity and dynamic power consumption when providing a high-performance equalization capability.

The solutions provided in this application are mainly described above from a perspective of interaction between network elements. It may be understood that, to implement the foregoing functions, the error correction apparatus includes corresponding hardware structures and/or software modules performing various functions. A person skilled in the art should easily be aware that, in combination with the examples described in the embodiments disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 13:
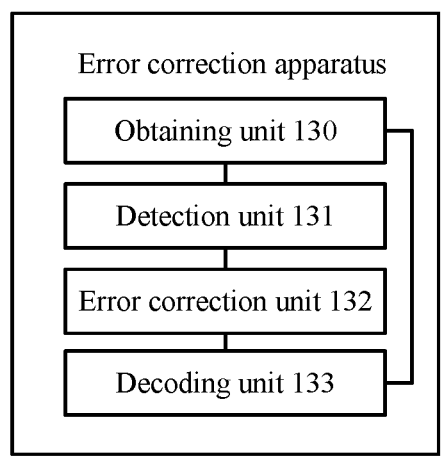
FIG. 13 is a schematic structural diagram 2 of an error correction apparatus according to this application.

As shown in FIG. 13, an error correction apparatus provided in this application includes:

an obtaining unit 130, configured to obtain a decision signal of a decision feedback equalizer DFE, and further configured to obtain at least one of an input signal, an equalized output signal, and a difference of the DFE, where the difference is a difference between a level value of the decision signal and a level value of the equalized output signal;

a detection unit 131, configured to determine a symbol location of an end of burst error of the decision signal based on detection of at least one of the decision signal, the equalized output signal, and the difference; and an error correction unit 132, configured to: when the detection unit 131 detects the symbol location, perform error correction on the decision signal based on the at least one of the input signal, the equalized output signal, and the difference.

Optionally, the detection unit 131 determines the symbol location of the end of burst error of the decision signal based on the detection of the at least one of the decision signal, the equalized output signal, and the difference in the following manner: when both the difference and the decision signal within a symbol period meet a condition A and a condition B, or meet a condition A and a condition C, determining that the symbol period is the symbol location of the end of burst error of the decision signal, where the condition A is that an absolute value of the difference within the symbol period is greater than a preset decision threshold;

the condition B is that the difference within the symbol period is greater than 0, and the level value of the decision signal within the symbol period is equal to a preset minimum level value; and the condition C is that the difference within the symbol period is less than 0, and the level value of the decision signal within the symbol period is equal to a preset maximum level value.

For example, based on the optional manner, a schematic structural diagram of the detection unit 131 is shown in FIG. 7(a).

Optionally, the detection unit 131 determines the symbol location of the end of burst error of the decision signal based on the detection of the at least one of the decision signal, the equalized output signal, and the difference in the following manner: when the equalized output signal within a symbol period meets a condition E or meets a condition F, determining that the symbol period is the symbol location of the end of burst error of the decision signal, where the condition E is that the level value of the equalized output signal within the symbol period is less than a difference between a preset minimum level value and a preset decision threshold; and the condition F is that the level value of the equalized output signal within the symbol period is greater than a sum of a preset maximum level value and the decision threshold.

For example, based on the optional manner, a schematic structural diagram of the detection unit 131 is shown in FIG. 7(b).

Optionally, that the error correction unit 132 performs the error correction on the decision signal based on the at least one of the input signal, the equalized output signal, and the difference specifically includes:

performing, based on the at least one of the input signal, the equalized output signal, and the difference, backtracking error correction on J decision signals that are located before the symbol location, to obtain a correct decision signal sequence.

Optionally, that the error correction unit 132 performs, based on the at least one of the input signal, the equalized output signal, and the difference, the backtracking error correction on the J decision signals that are located before the symbol location, to obtain the correct decision signal sequence specifically includes:

performing the backtracking error correction on the J decision signals based on the input signal and the output signal by using a maximum likelihood sequence estimation algorithm, to obtain the correct decision signal sequence.

For example, based on the optional manner, a schematic structural diagram of the error correction unit 132 may be shown in FIG. 11(a) or FIG. 11(c).

Optionally, that the error correction unit 132 performs, based on the at least one of the input signal, the equalized output signal, and the difference, the backtracking error correction on the J decision signals that are located before the symbol location, to obtain the correct decision signal sequence specifically includes:

performing the backtracking error correction on the J decision signals by using error control coding ECC of the input signal, to obtain the correct decision signal sequence.

For example, based on the optional manner, a schematic structural diagram of the error correction unit 132 may be shown in FIG. 11(c).

Optionally, that the error correction unit 132 performs, based on the at least one of the input signal, the equalized output signal, and the difference, the backtracking error correction on the J decision signals that are located before the symbol location, to obtain the correct decision signal sequence specifically includes: performing the backtracking error correction on the J decision signals based on the input signal and the difference in a direct detection manner, to obtain the correct decision signal sequence.

For example, based on the optional manner, a schematic structural diagram of the error correction unit 132 may be shown in FIG. 11(c).

Optionally, the error correction apparatus further includes a decoding unit 133.

The decoding unit 133 is configured to: before the detection unit 131 determines the symbol location of the end of burst error of the decision signal based on the detection of the at least one of the decision signal, the equalized output signal, and the difference, perform (1+D) decoding on the obtained decision signal, to obtain a decoded decision signal.

That the error correction unit 132 performs the error correction on the decision signal based on the at least one of the input signal, the equalized output signal, and the difference specifically includes: performing error correction on the decoded decision signal at the symbol location.

The decoding unit 133 may be a unit module of the error correction unit 132, and the decoding unit 133 may be specifically a 1+D decoder. Therefore, based on the optional manner, a schematic structural diagram of the error correction unit 132 may be shown in FIG. 11(b).

Optionally, the input signal is a pulse amplitude modulation PAM signal, a quadrature phase shift keying QPSK signal, or a quadrature amplitude modulation QAM signal.

For example, the error correction apparatus provided in this application may be implemented in a circuit manner. For example, the detection unit 131 may be a detection circuit, the error correction unit 132 may be an error correction circuit, the decoding unit 133 may be a decoding circuit, and the obtaining unit 130 may be an obtaining circuit.

By using the error correction apparatus provided in this application, a bit error transfer feature of the DFE is used to detect the symbol location of the end of burst error caused by the DFE, and correct an erroneous decision signal, so as to reduce a bit error rate of the DFE and improve equalization performance.

Figure 14:
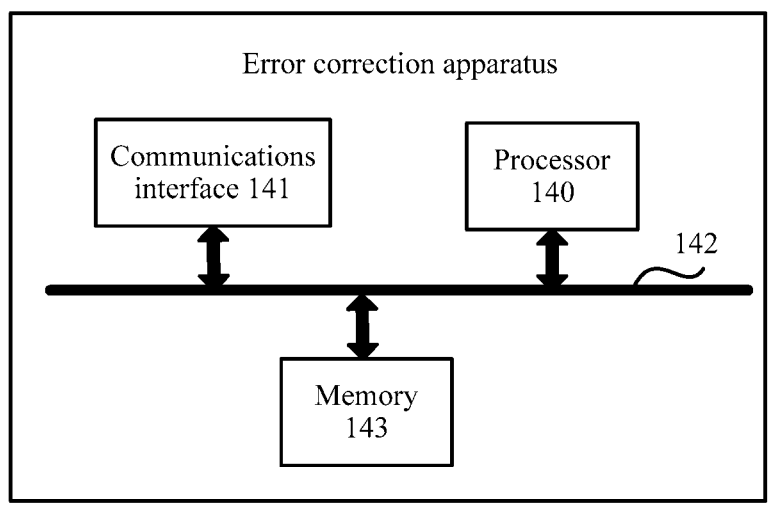
FIG. 14 is a schematic structural diagram 3 of an error correction apparatus according to this application.

As shown in FIG. 14, another possible schematic structural diagram of an error correction apparatus provided in this application includes a processor 140, a communications interface 141, a bus 142, and a memory 143.

The processor 140 may be a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The processor may implement or execute various example logical blocks, modules, and circuits described with reference to content disclosed in this application. Alternatively, the processor 140 may be a combination of processors implementing a computing function, for example, a combination of one or more microprocessors, or a combination of the DSP and a microprocessor.

When the error correction apparatus is used as an error correction apparatus, the processor 140 can be configured to perform a method step performed by each function module of the error correction apparatus in FIG. 6 or FIG. 10. For a specific error correction method performed by the processor 140, refer to related descriptions in the embodiment shown in FIG. 6 or FIG. 10. Details are not described herein again.

The communications interface 141 may be a transceiver of the error correction apparatus. The processor 140 sends a signal to a module and receives a signal from a module by using the communications interface 141.

The processor 140, the communications interface 141, and the memory 143 are connected to each other by using the bus 142. The bus 142 may be a peripheral component interconnect (PCI) bus, an extended industry standard architecture (EISA) bus, or the like. The bus 142 may be classified into an address bus, a data bus, a control bus, and the like. For ease of representation, only one thick line is used to represent the bus in FIG. 14, but this does not mean that there is only one bus or only one type of bus.

By using the error correction apparatus provided in this application, a bit error transfer feature of a DFE is used to detect a symbol location of an end of burst error caused by the DFE, and correct an erroneous decision signal, so as to reduce a bit error rate of the DFE and improve equalization performance.

For example, method or algorithm steps described in combination with the content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

In specific implementation, this application further provides a computer storage medium, where the computer storage medium may store a program, and when the program is executed, some or all of the steps of the embodiments of the error correction method provided in this application may be performed. The storage medium may be a magnetic disk, an optical disc, a read-only memory (ROM), a random access memory (RAM), or the like.

This application further provides a computer program product that includes an instruction, and when run on a computer, the computer program product enables the computer to perform some or all of the steps in the embodiments of the error correction method provided in this application.

A person skilled in the art may clearly understand that, the technologies in this application may be implemented by software in addition to a necessary general hardware platform. Based on such an understanding, the technical solutions of this application essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a server, or a VPN gateway) to perform the methods described in the embodiments or in some parts of the embodiments of this application.

For same or similar parts in the embodiments in this specification, mutual reference may be made between these embodiments. Especially, the apparatus embodiment is basically similar to a method embodiment, and therefore is described briefly; for related parts, refer to descriptions in the method embodiment.

The foregoing descriptions are implementations of the present invention, but are not intended to limit the protection scope of the present invention.

What is claimed is:

1. An error correction method, applied to an error correction apparatus having a plurality of circuits, the method comprising:
    obtaining, by an obtaining circuit, a decision signal of a decision feedback equalizer (DFE);
    obtaining, by the obtaining circuit, at least one of an input signal, an equalized output signal, or a difference of the DFE, wherein the difference is a difference between a level value of the decision signal and a level value of the equalized output signal;
    determining, by a detection circuit, a symbol location of an end of a burst error of the decision signal based on detection of at least one of the decision signal, the equalized output signal, or the difference; and
    in response to the symbol location being detected, performing, by an error correction circuit, error correction on the decision signal based on the at least one of the input signal, the equalized output signal, or the difference.

2. The error correction method according to claim 1, wherein the determining the symbol location further comprises:
    in response to both the difference and the decision signal within a symbol period meeting a condition A and a condition B, or meeting the condition A and a condition C, determining that the symbol period is the symbol location of the end of burst error of the decision signal, wherein
    the condition A is that an absolute value of the difference within the symbol period is greater than a preset decision threshold;
    the condition B is that the difference within the symbol period is greater than 0, and the level value of the decision signal within the symbol period is equal to a preset minimum level value; and
    the condition C is that the difference within the symbol period is less than 0, and the level value of the decision signal within the symbol period is equal to a preset maximum level value.

3. The error correction method according to claim 1, wherein the determining the symbol location further comprises:
    in response to the equalized output signal within a symbol period meeting a condition E or meeting a condition F, determining that the symbol period is the symbol location of the end of burst error of the decision signal, wherein
    the condition E is that the level value of the equalized output signal within the symbol period is less than a difference between a preset minimum level value and a preset decision threshold; and
    the condition F is that the level value of the equalized output signal within the symbol period is greater than a sum of a preset maximum level value and the decision threshold.

4. The error correction method according to claim 1, wherein the performing the error correction on the decision signal further comprises:
    performing, based on the at least one of the input signal, the equalized output signal, or the difference, backtracking error correction on J decision signals that are located before the symbol location, to obtain a correct decision signal sequence, wherein J is a positive integer greater than 1.

5. The error correction method according to claim 4, wherein the performing the backtracking error correction on the J decision signals further comprises:
    performing the backtracking error correction on the J decision signals based on the input signal and the equalized output signal by using a maximum likelihood sequence estimation algorithm, to obtain the correct decision signal sequence.

6. The error correction method according to claim 4, wherein the performing the backtracking error correction on the J decision signals further comprises:
    performing the backtracking error correction on the J decision signals by using error control coding (ECC) of the input signal, to obtain the correct decision signal sequence.

7. The error correction method according to claim 4, wherein the performing the backtracking error correction on the J decision signals further comprises:
    performing the backtracking error correction on the J decision signals based on the input signal and the difference in a direct detection manner, to obtain the correct decision signal sequence.

8. The error correction method according to claim 1, wherein before the determining the symbol location, the method further comprises:
    performing (1+D) decoding on the obtained decision signal, to obtain a decoded decision signal, wherein D is an integer greater than or equal to 0; and
    wherein the performing the error correction on the decision signal further comprises:
    performing error correction on the decoded decision signal at the symbol location.

9. The error correction method according to claim 1, wherein
    the input signal is a pulse amplitude modulation (PAM) signal, a quadrature phase shift keying (QPSK) signal, or a quadrature amplitude modulation (QAM) signal.

10. An error correction apparatus, comprising:
    an obtaining circuit, configured to obtain a decision signal of a decision feedback equalizer (DFE), and further configured to obtain at least one of an input signal, an equalized output signal, or a difference of the DFE, wherein the difference is a difference between a level value of the decision signal and a level value of the equalized output signal;
    a detection circuit, configured to determine a symbol location of an end of burst error of the decision signal based on detection of at least one of the decision signal, the equalized output signal, or the difference; and an error correction circuit, configured to: in response to the detection circuit detecting the symbol location, perform error correction on the decision signal based on the at least one of the input signal, the equalized output signal, or the difference.

11. The error correction apparatus according to claim 10, wherein the detection circuit determines the symbol location of the end of burst error of the decision signal based on the detection of the at least one of the decision signal, the equalized output signal, or the difference in the following manner: in response to both the difference and the decision signal within a symbol period meeting a condition A and a condition B, or meeting the condition A and a condition C, determining that the symbol period is the symbol location of the end of burst error of the decision signal, wherein the condition A is that an absolute value of the difference within the symbol period is greater than a preset decision threshold;

the condition B is that the difference within the symbol period is greater than 0, and the level value of the decision signal within the symbol period is equal to a preset minimum level value; and the condition C is that the difference within the symbol period is less than 0, and the level value of the decision signal within the symbol period is equal to a preset maximum level value.

12. The error correction apparatus according to claim 10, wherein the detection circuit determines the symbol location of the end of burst error of the decision signal based on the detection of the at least one of the decision signal, the equalized output signal, or the difference in the following manner: in response to the equalized output signal within a symbol period meeting a condition E or meeting a condition F, determining that the symbol period is the symbol location of the end of burst error of the decision signal, wherein the condition E is that the level value of the equalized output signal within the symbol period is less than a difference between a preset minimum level value and a preset decision threshold; and the condition F is that the level value of the equalized output signal within the symbol period is greater than a sum of a preset maximum level value and the decision threshold.

13. The error correction apparatus according to claim 10, wherein that the error correction circuit performs the error correction on the decision signal further comprises:

performing, based on the at least one of the input signal, the equalized output signal, or the difference, backtracking error correction on J decision signals that are located before the symbol location, to obtain a correct decision signal sequence, wherein J is a positive integer greater than 1.

14. The error correction apparatus according to claim 13, wherein that the error correction circuit performs further comprises:

performing the backtracking error correction on the J decision signals based on the input signal and the equalized output signal by using a maximum likelihood sequence estimation algorithm, to obtain the correct decision signal sequence.

15. The error correction apparatus according to claim 13, wherein that the error correction circuit performs the backtracking error correction on the J decision signals further comprises:

performing the backtracking error correction on the J decision signals by using error control coding (ECC) of the input signal, to obtain the correct decision signal sequence.

16. The error correction apparatus according to claim 13, wherein that the error correction circuit performs the backtracking error correction on the J decision signals further comprises:

performing the backtracking error correction on the J decision signals based on the input signal and the difference in a direct detection manner, to obtain the correct decision signal sequence.

17. The error correction apparatus according to claim 10, further comprising a decoding circuit;

the decoding circuit is configured to: before the detection circuit determines the symbol location of the end of burst error of the decision signal based on the detection of the at least one of the decision signal, the equalized output signal, or the difference, perform (1+D) decoding on the obtained decision signal, to obtain a decoded decision signal, wherein D is an integer greater than or equal to 0; and that the error correction circuit performs the error correction on the decision signal based on the at least one of the input signal, the equalized output signal, or the difference specifically comprises:

performing error correction on the decoded decision signal at the symbol location.

18. The error correction apparatus according to claim 10, wherein the input signal is a pulse amplitude modulation (PAM) signal, a quadrature phase shift keying (QPSK) signal, or a quadrature amplitude modulation (QAM) signal.

19. A non-transitory computer readable storage medium, comprising an instruction, which when executed by a computer, causes the computer to perform an error correction method including the following operations:

obtaining a decision signal of a decision feedback equalizer (DFE);

obtaining at least one of an input signal, an equalized output signal, or a difference of the DFE, wherein the difference is a difference between a level value of the decision signal and a level value of the equalized output signal;

determining a symbol location of an end of a burst error of the decision signal based on detection of at least one of the decision signal, the equalized output signal, or the difference; and in response to the symbol location being determined, performing error correction on the decision signal based on the at least one of the input signal, the equalized output signal, or the difference.

20. The non-transitory computer readable storage medium according to claim 19, wherein the operation of determining the symbol location further comprises:

in response to both the difference and the decision signal within a symbol period meeting a condition A and a condition B, or meeting the condition A and a condition C, determining that the symbol period is the symbol location of the end of burst error of the decision signal, wherein the condition A is that an absolute value of the difference within the symbol period is greater than a preset decision threshold;

the condition B is that the difference within the symbol period is greater than 0, and the level value of the decision signal within the symbol period is equal to a preset minimum level value; and the condition C is that the difference within the symbol period is less than 0, and the level value of the decision signal within the symbol period is equal to a preset maximum level value.

* * * * *

UNITED STATES PATENT AND TRADEMARK OFFICE
CERTIFICATE OF CORRECTION

PATENT NO. : 11,218,246 B2
APPLICATION NO. : 16/889231
DATED : January 4, 2022
INVENTOR(S) : Lu Page 1 of 1

It is certified that error appears in the above-identified patent and that said Letters Patent is hereby corrected as shown below:

In the Claims

Claim 14: Column 35, Line 57: "wherein that the error correction circuit performs further" should read -- wherein that the error correction circuit performs the backtracking error correction on the J decision signals further --.

Signed and Sealed this
Seventh Day of June, 2022

Katherine Kelly Vidal
*Director of the United States Patent and Trademark Office*